(12) United States Patent
Yazaki et al.

(10) Patent No.: US 8,040,889 B2
(45) Date of Patent: Oct. 18, 2011

(54) PACKET FORWARDING DEVICE

(75) Inventors: Takeki Yazaki, Kawasaki (JP); Mitsuru Nagasaka, Kokubunji (JP); Shinichi Akahane, Hachioji (JP)

(73) Assignee: Alaxala Networks Corporation, Kanagawa (JP)

( * ) Notice: Subject to any disclaimer, the term of this patent is extended or adjusted under 35 U.S.C. 154(b) by 455 days.

(21) Appl. No.: 12/222,153

(22) Filed: Aug. 4, 2008

(65) Prior Publication Data
US 2009/0109985 A1  Apr. 30, 2009

(30) Foreign Application Priority Data
Oct. 30, 2007 (JP) ................................. 2007-281773

(51) Int. Cl.
*H04L 12/28* (2006.01)
(52) U.S. Cl. ........................ 370/392; 370/400; 455/552.1
(58) Field of Classification Search .................. 370/252, 370/389, 390, 392, 400, 468; 455/552.1
See application file for complete search history.

(56) References Cited

U.S. PATENT DOCUMENTS

| 6,963,577 | B1* | 11/2005 | Tomonaga et al. | ............ 370/412 |
| 2002/0141403 | A1* | 10/2002 | Akahane et al. | ............. 370/389 |
| 2003/0095551 | A1* | 5/2003 | Gotoh et al. | ............... 370/395.3 |
| 2004/0202184 | A1* | 10/2004 | Yazaki et al. | ............ 370/395.31 |
| 2006/0114924 | A1* | 6/2006 | Yazaki et al. | ................. 370/428 |
| 2007/0201461 | A1 | 8/2007 | Shinohara et al. | |

FOREIGN PATENT DOCUMENTS

| JP | 11-88458 | 9/1997 |
| JP | 11-234344 | 2/1998 |
| JP | 2007-228491 | 2/2006 |

* cited by examiner

*Primary Examiner* — Jung Park
(74) *Attorney, Agent, or Firm* — Stites & Harbison PLLC; Juan Carlos A. Marquez, Esq.

(57) ABSTRACT

A power-saving packet forwarding device realizing electric power that accords to the number of lines in which communication is performed and a traffic volume inputted from the lines. A header processing unit with which the packet forwarding device is equipped has a plurality of packet processing circuits for performing a packet processing. A line number decision circuit monitors the number of lines in which communication is performed and a traffic volume inputted from the line, and decides presence or absence of an operation of a packet processing circuit. Based on this decision result, a power supply and a clock of the packet processing circuit that does not need to operate are interrupted, and accordingly power saving of the packet forwarding device is realized.

15 Claims, 13 Drawing Sheets

FIG. 8

700
FLOW TABLE CAM

| ADDRESS | | | | | | | | | |
|---|---|---|---|---|---|---|---|---|---|
| 1 | SIP1 | DIP1 | SPORT1 | DPORT1 | DSCP1 | SMAC1 | DMAC1 | UPRI1 | 710-1 |
| 2 | SIP2 | DIP2 | SPORT2 | DPORT2 | DSCP2 | SMAC2 | DMAC2 | UPRI2 | 710-2 |
| 3 | SIP3 | DIP3 | SPORT3 | DPORT3 | DSCP3 | SMAC3 | DMAC3 | UPRI3 | 710-3 |
| 4 | SIP4 | DIP4 | SPORT4 | DPORT4 | DSCP4 | SMAC4 | DMAC4 | UPRI4 | 710-4 |
| 5 | SIP5 | DIP5 | SPORT5 | DPORT5 | DSCP5 | SMAC5 | DMAC5 | UPRI5 | 710-5 |
| 6 | SIP6 | DIP6 | SPORT6 | DPORT6 | DSCP6 | SMAC6 | DMAC6 | UPRI6 | 710-6 |
| 7 | SIP7 | DIP7 | SPORT7 | DPORT7 | DSCP7 | SMAC7 | DMAC7 | UPRI7 | 710-7 |
| ⋮ | | | | | | | | | |
| n | SIPn | DIPn | SPORTn | DPORTn | DSCPn | SMACn | DMACn | UPRIn | 710-n |

FIG. 9

800
FLOW TABLE MEMORY

| ADDRESS | | | | |
|---|---|---|---|---|
| 1 | FILTER INFORMATION 1 | QoS INFORMATION 1 | COUNTER 1 | 810-1 |
| 2 | FILTER INFORMATION 2 | QoS INFORMATION 2 | COUNTER 2 | 810-2 |
| 3 | FILTER INFORMATION 3 | QoS INFORMATION 3 | COUNTER 3 | 810-3 |
| 4 | FILTER INFORMATION 4 | QoS INFORMATION 4 | COUNTER 4 | 810-4 |
| 5 | FILTER INFORMATION 5 | QoS INFORMATION 5 | COUNTER 5 | 810-5 |
| 6 | FILTER INFORMATION 6 | QoS INFORMATION 6 | COUNTER 6 | 810-6 |
| 7 | FILTER INFORMATION 7 | QoS INFORMATION 7 | COUNTER 7 | 810-7 |
| ⋮ | | | | |
| n | FILTER INFORMATION n | QoS INFORMATION n | COUNTER n | 810-n |

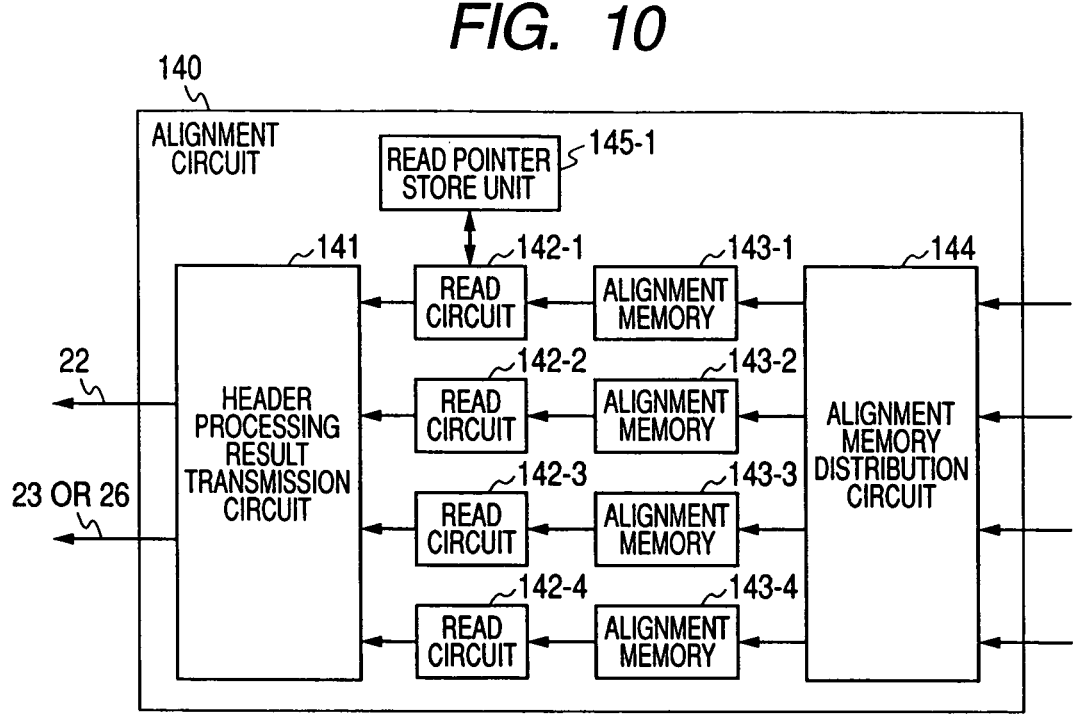

| ADDRESS (BINARY NUMBER) | DESTINATION INFORMATION | FILTER INFORMATION 1/QoS INFORMATION | |
|---|---|---|---|
| 0000 | DESTINATION INFORMATION 1 | FILTER INFORMATION/QoS INFORMATION 1 | 145-1 |
| 0001 | DESTINATION INFORMATION 2 | FILTER INFORMATION/QoS INFORMATION 2 | 145-2 |
| 0010 | DESTINATION INFORMATION 3 | FILTER INFORMATION/QoS INFORMATION 3 | 145-3 |
| 0011 | DESTINATION INFORMATION 4 | FILTER INFORMATION/QoS INFORMATION 4 | 145-4 |
| 0101 | DESTINATION INFORMATION 5 | FILTER INFORMATION/QoS INFORMATION 5 | 145-5 |
| 0110 | DESTINATION INFORMATION 6 | FILTER INFORMATION/QoS INFORMATION 6 | 145-6 |
| 0111 | DESTINATION INFORMATION 7 | FILTER INFORMATION/QoS INFORMATION 7 | 145-7 |
| ⋮ | ⋮ | ⋮ | |
| 1000 | DESTINATION INFORMATION 16 | FILTER INFORMATION/QoS INFORMATION 16 | 145-16 |

143-k ALIGNMENT MEMORY

PACKET FORWARDING DEVICE

CLAIM OF PRIORITY

The present application claims priority from Japanese patent application JP 2007-281773 field on Oct. 30, 2007, the content of which is hereby incorporated by reference into this application.

FIELD OF THE INVENTION

The present invention relates to a packet forwarding device for forwarding a packet under a power-saving condition.

BACKGROUND OF THE INVENTION

With a backdrop of the spread of the Internet, enhancement in the speed of packet forwarding devices, such as a router and a switch constituting the Internet communication systems, is sought for. The router and the switch are provided with a plurality of input lines and output lines, and when a packet is inputted thereinto from the input line, they decide an output line from a destination address in its header and forward the packet into the output line. Further, the router and the switch identify a flow that is a series of packet flows to which the packet belongs, and execute filtering processing of deciding passing/discarding of the packet, decision processing of priority in a network (in the present application, this processing is called a flow processing), etc. for each flow.

For enhancement in the speed of a packet forwarding device, since it is necessary to increase the number of devices, such as ASIC (Application Specific Integrated Circuit), or to increase the frequency, power consumption increases along with enhancement in the speed of the router and the switch. For this reason, it is required to reduce the power consumption and thereby minimize the increase in electric power accompanying the speed enhancement.

A method for realizing reduction in the power consumption of the packet forwarding device is described, for example, in JP-A-Hei11 (1999)-88458. The document describes that the packet forwarding device thereof monitors the presence of link connections with a plurality of lines that the packet forwarding device is equipped with, and turns on a power supply of a port control circuit for performing the packet processing when the link connection is found to exist. By turning off the power supply of the port control circuit that is not required to perform the processing, reduction in the power consumption of the packet forwarding device is realized.

Another method for realizing the reduction in the power consumption of the packet forwarding device is described, for example, in JP-A-Hei11 (1999)-234344. The packet forwarding device of this document has an access state monitoring unit that monitors a plurality of interface ports for accommodating the lines and access states of the interface ports, and a power supply control unit that decides whether currents are made to pass the respective interface ports according to respective monitoring states of the access state monitoring unit. By turning off the power supply of the interface port to which no access is made, the reduction in the power consumption is realized.

In addition, as a technology of suppressing the power consumption without sacrificing performance of network relay devices, there is JP-A-2007-228491.

SUMMARY OF THE INVENTION

In the packet forwarding devices of JP-A-Hei11 (1999)-88458 and JP-A-Hei11 (1999)-234344, a port circuit control unit for processing the packet and an interface port correspond to a single line. Here, a case where the port circuit control unit and the interface port accommodate lines of a low-speed compared to the above-mentioned line. In this occasion, if the lines are of low-speed in the port circuit control unit and the interface port, they usually accommodate a plurality of lines. Although JP-A-Hei11 (1999)-88458 describes that On/Off is switched over according to presence or absence of the link connection of the port circuit control unit, if a plurality of lines are accommodated and a part of the lines have link connections, in order to support the lines that have link connections, the port line control unit has no other alternative but to be always turned On. For this reason, there is a problem that it causes electric power for sustaining performance more than necessary to be supplied to the port circuit control unit, resulting in consumption of useless electric power.

JP-A-Hei11 (1999)-234344 describes that On/Off of the interface port is switched over according to an access state of the interface port. However, when a plurality of lines are accommodated and a part of the lines have access states, in order to support these lines, the interface port has no other alternative but to be always turned On. There is a problem that it causes the electric power for sustaining performance more than necessary to be supplied to the interface port, resulting in the consumption of useless electric power.

Now consider a case where communication is performed using a part of a bandwidth of the lines that the port circuit control unit and the interface port accommodate in the packet forwarding device described in JP-A-Hei11 (1999)-88458 and JP-A-Hei11 (1999)-234344. In this occasion, in order to perform processing of a packet that is inputting, a power supply of the port line control unit and the interface port has no other alternative but to be always turned on. Consequently, this scheme becomes to supply the electric power sustaining performance more than necessary to the port circuit control unit and the interface port, which induces a problem of the consumption of useless electric power.

On the other hand, JP-A-2007-228491 discloses a configuration where two relay sets are mounted on a relay processing board. However, it only suggests dynamic execution of changing stop/supply of a clock signal to these sets based on monitoring of a packet flow rate.

The present invention is devised in order to solve these problems. A first object of the present invention is to provide a packet forwarding device such that electric power of its function unit for performing packet processing is equal to electric power that accords to the number of lines in which communication is performed. In other words, the object is to provide a packet forwarding device capable of reducing the power consumption when the number of lines in which communication is performed decreases. Moreover, a second object of the present invention is to provide a packet forwarding device such that the electric power of the function unit for performing packet processing becomes equivalent to the electric power that accords to a bandwidth of the packet to be processed. That is, the object is to provide a packet forwarding device capable of reducing power consumption when packets that reaches the packet forwarding device or are transmitted from the packet forwarding device decrease in number.

In order to solve the problem described above, the packet forwarding device of the present invention is characterized by having: a plurality of packet processing circuits that perform one or more than one processing among processings of deciding an output line in which the packet is forwarded from header information of the packet, processing of deciding the presence or absence of forwarding of the packet, processing of deciding a forwarding priority of the packet, and processing of collecting statistical information of a flow to which the packet belongs; a circuit number decision circuit that decides the presence or absence of an operation of each of the packet processing circuits and notifies the packet processing circuits of a decision result; and an distribution circuit for distributing the processing to the packet processing circuit in operation for each packet. Other problems than the above mentioned that this application tries to solve and its solving means will be clarified by explanations of embodiments and drawings that will be described later.

The packet forwarding device of the present invention can fit the electric power of the function unit for performing the packet processing to the electric power that accords to the number of lines in which communication is performed. That is, the power consumption can be reduced if the number of lines in which the communication is performed decreases. Further, in the packet forwarding device of the present invention, the electric power of the functional unit for performing the packet processing can be made the electric power that accords to the bandwidth of the packet to be processed. That is, the power consumption can be reduced if the packets that reach the packet forwarding device or the packet forwarding device transmit are made small in number.

BRIEF DESCRIPTION OF THE DRAWINGS

FIG. 8 is a diagram showing a format of a flow table CAM of the first embodiment;

FIG. 9 is a diagram showing a format of flow table memory of the first embodiment;

FIG. 10 is a block diagram of an alignment circuit of the first embodiment;

FIG. 11 is a diagram showing a format of alignment memory of the first embodiment;

DETAILED DESCRIPTION OF THE PREFERRED EMBODIMENTS

Hereafter, embodiments for carrying out the present invention will be described in details using drawings.

First Embodiment

Figure 2:
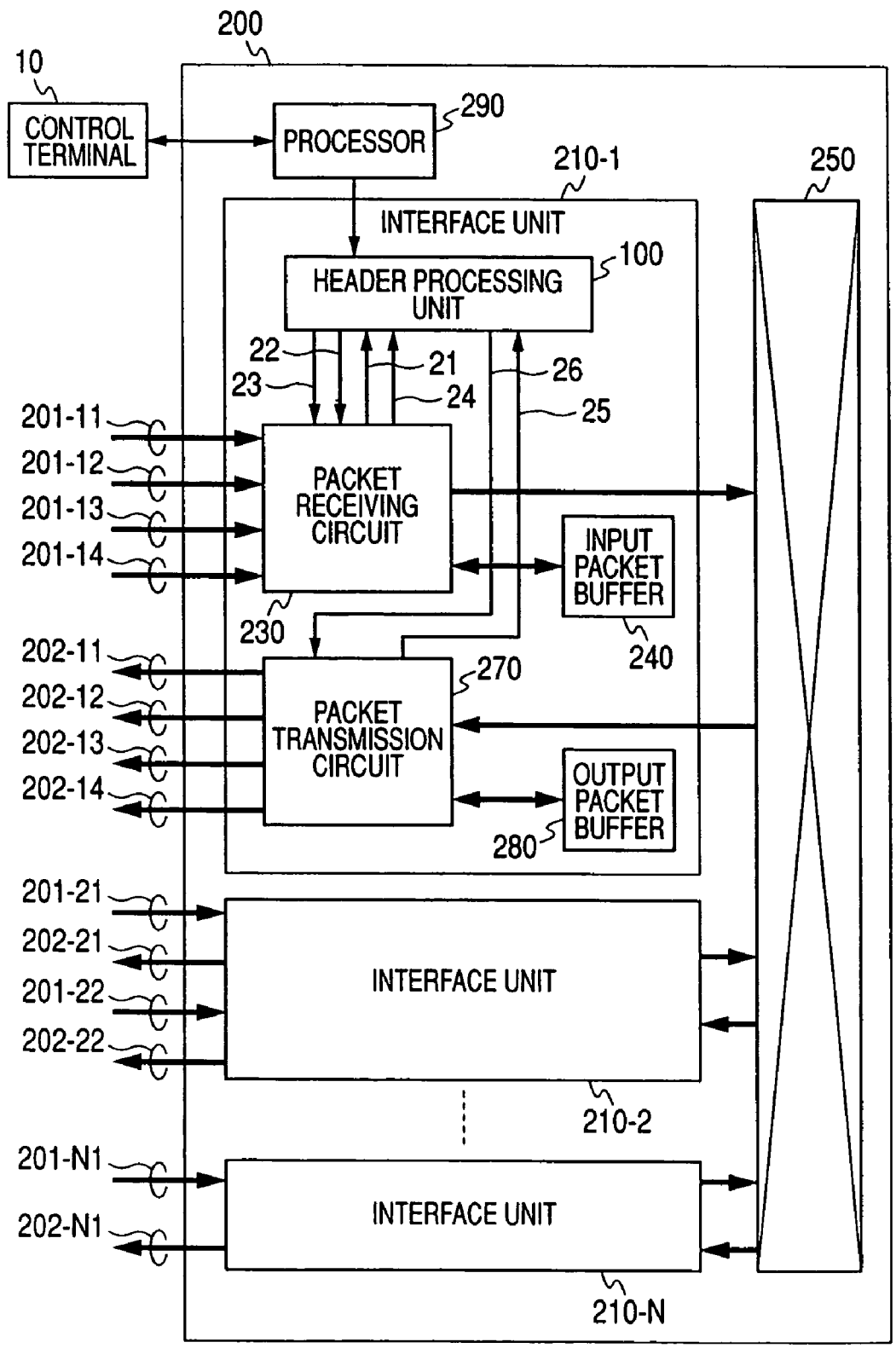
FIG. 2 is a diagram showing the whole configuration of a packet forwarding device in the first embodiment.

Outline operations of a packet forwarding device that is a first embodiment of the present invention will be described using FIG. 2, FIG. 3, and FIG. 4. FIG. 2 shows a block diagram of a packet forwarding device 200 of the first embodiment. The packet forwarding device 200 is constructed with N interface units 210-$i$ ($i$=1 to N), M input lines 201-$ij$ ($i$=1 to N) ($j$=1 to M), M output lines 202-$ij$ ($i$=1 to N) ($j$=1 to M) that the interface units 210-$i$ accommodate, a header processing unit 100, a single packet relay processing unit 250 for connecting the interface units 210-$i$, and a single processor 290. Being connected with an external control terminal 10, the processor 290 notifies the interface unit 210 of an instruction of the control terminal 10, notifies the control terminal 10 of information of the interface unit 210, and does similar things.

The packet forwarding device 200 of FIG. 2 accommodates the input/output lines as follows. The interface unit 210-1 thereof accommodates the input lines 201-11, 201-12, 201-13, and 201-14 and the output lines 202-11, 202-12, 202-13, and 202-14. The interface unit 210-2 thereof accommodates input lines 201-21 and 201-22, and output lines 202-21 and 202-22. The interface unit 210-N thereof accommodates an input line 201-N1 and an output line 202-N1. The interface unit 210-$i$ is constructed with a packet receiving circuit 230 and an input packet buffer (PB) 240 that perform a reception processing of the packet, and a packet transmission circuit 270 and an output packet buffer (PB) 280 that perform a transmission processing of the packet.

Figure 3:
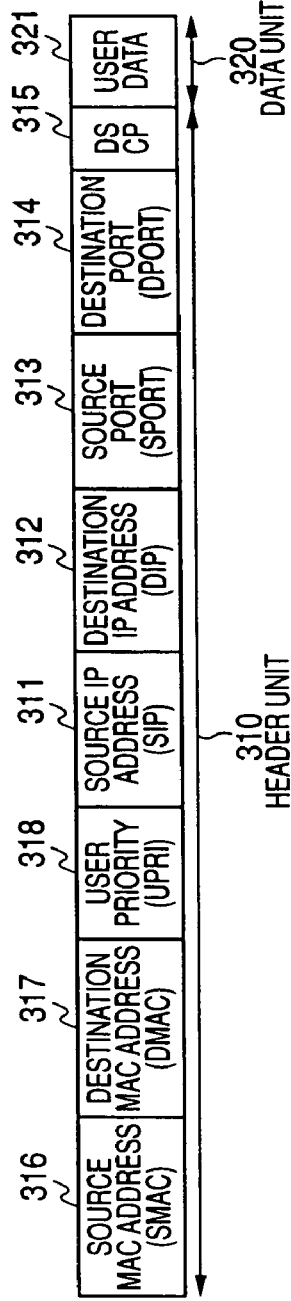
FIG. 3 is a diagram showing a format of a packet that the packet forwarding device of the first embodiment 1 transmits and receives.

FIG. 3 shows one example of a format of a packet inputted from the input lines 201-$ij$ and outputted into the output lines 202-$ij$ of the FIG. 2. This format comprises a header unit 310 and a data unit 320. The header unit 310 is composed of a source IP address 311 (hereinafter referred to as "SIP") that is a source IP address of a network layer (an address of a transmission terminal), a destination IP address 312 (hereinafter referred to as "DIP") that is a destination address (an address of a reception terminal), a source port 313 (hereinafter referred to as "SPORT") showing a protocol (=host application), a destination port 314 (hereinafter referred to as "DPORT"), a differentiated service code point 315 DSCP (hereinafter referred to as "SMAC"), a source MAC address 316 (hereinafter referred to as "SMAC") that is a source address of a data link layer, a destination MAC address 317 (hereinafter referred to as "DMAC") that is a destination address, and a user priority 318 (hereafter referred to as "UPRI") showing a forwarding priority of the data link layer. The data unit 320 is made up of user data 321.

Figure 4:
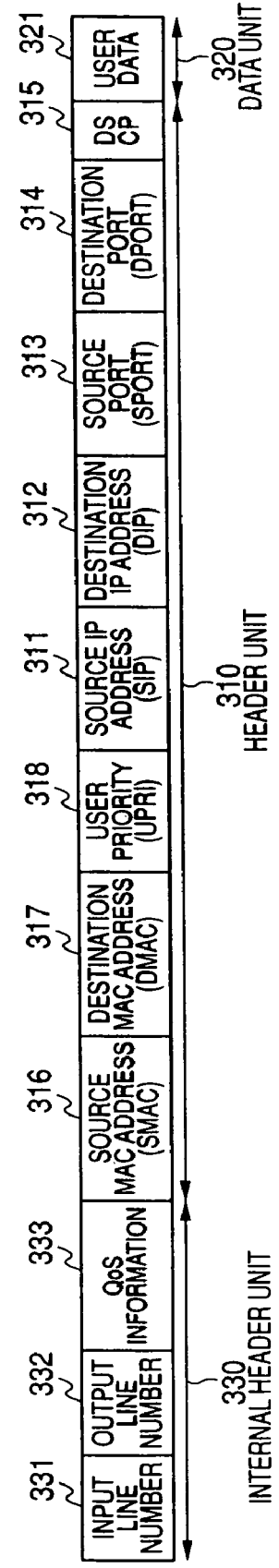
FIG. 4 is a diagram showing the format of the packet in the packet forwarding device of the first embodiment.

FIG. 4 shows an example of a packet format inside the packet forwarding device (node) 200 of FIG. 2. This format is the format described above added with an internal header unit 330. This internal header unit 330 is composed of input line number 331 that is an identification number of a line in which the packet is inputted, output line number 332 that is an identification number of a line from which the packet is outputted, and QoS information 333 showing a transmission priority of the packet.

In the interface unit 210-1 of FIG. 2, when the packet is inputted into the input line 201, the packet receiving circuit 230 adds the internal header unit 330 to this, and stores this packet in the input packet buffer (PB) 240, and at the same time writes a number of a line into which the packet is inputted, i.e., an input line number, in input line number 331 and transmits the whole information of the header unit 310 and the input line number 331 to the header processing unit 100 as header information 21.

The header processing unit 100 performs an output destination decision processing that decides the output line number of the packet inputted from SIP 311, DIP 312, SPORT 313, DPORT 314, DSCP 315, SMAC 316, DMAC 317, and UPRI 318 in the header information 21, and a flow processing that decides a flow to which the packet belongs, determines the filter information and the QoS information of the flow, and counts the input packet for each flow. Then, the header processing unit 100 transmits flow information 23 that comprises output line information 22 made up of the decided output line number, the filter information, and the QoS information to the packet receiving circuit 230.

When the filter information in the flow information 23 is "forwarding," the packet receiving circuit 230 writes the output line number in the output line information 22 and the QoS information in the flow information 23 into fields of the output line number 332 and the QoS information 333 of the packet stored in an input packet buffer 240, and transmits them to the packet relay processing unit 250. On the other hand, when the filter information in the flow information 23 is "discard", a store packet is not forwarded to the packet relay processing unit 250. This packet will be finally overwritten and discarded at the time of arrival of other packet. The packet relay processing unit 250 transmits the received packet to the packet transmission circuit 270 of the interface unit 210-*i* corresponding to the output line number 332.

The packet transmission circuit 270 stores the packet in the output packet buffer 280, and at the same time transmits the whole information of the header unit 310 and the output line number 332 to the header processing unit 100 as the header information 25. The header processing unit 100 detects a flow to which the packet inputted from SIP 311, DIP 312, SPORT 313, DPORT 314, DSCP 315, SMAC 316, DMAC 317, and UPRI 318 in header information 25 belongs, determines the filter information and the QoS information, and performs the flow processing of counting the input packet for each flow. Then, the header processing unit 100 transmits flow information 26 that comprises the decided filter information and the QoS information to the packet transmission circuit 270.

When the filter information in the flow information 26 is "forwarding," the packet transmission circuit 270 writes the QoS information in the flow information 26 into a field of the QoS information 333 of the packet stored in the output packet buffer 280, and transmits it to the output line 202-*ij* based on a value recorded in the field of the output line number 332. On the other hand, when the filter information in the flow information 26 is "discard", the packet transmission circuit 270 forwards a stored packet to the output line 202-*ij*. The packet is finally overwritten and discarded by other packet at its arrival time.

Next, detailed operations of the header processing unit 100 of the first embodiment shown in FIG. 1 will be explained. The header processing unit 100 is constructed with an input header processing unit 101 for performing packet processing based on header information 21 notified by the packet receiving circuit 230 and an output header processing unit 102 for performing the packet processing based on the header information 25 notified by the packet transmission circuit 270.

The input header processing unit 101 has: a routing table CAM 500 and routing table memory 600 that are necessary for the output destination decision processing described above; a flow table CAM 700 and flow table memory 800 that are necessary for the flow processing described above; four packet processing circuits 110-*k* (k=1 to 4) that performs the output destination decision processing and the flow processing by accessing the routing table CAM 500 and the routing table memory 600; a routing table control unit 150 that accesses to the CAM 500 and the memory 600 according to access requests to the routing table CAM 500 and the routing table memory 600 from the packet processing circuits 110-*k* (k=1 to 4); and a flow table control unit 160 that accesses to the CAM 700 and the memory 800 according to access requests to the flow table CAM 700 and the flow table memory 800 from the packet processing circuits 110-*k* (k=1 to 4).

Moreover, the input header processing unit 101 has a header information store buffer 120 that stores a plurality of pieces of header information 21 and distributes/transmits the header information 21 to any one of the packet processing circuits 110-*k*, and an alignment circuit 140 that rearranges destination information, the filter information, and the QoS information decided by the packet processing circuit 110-*k* for each input line in an order of input of the header information corresponding to these pieces of information and outputs them as the flow information 23. Further, the input header processing unit 101 is equipped with a circuit number decision circuit 170 that will be explained in details later.

The output header processing unit 102 is of the same configuration as the input header processing unit 100 except that it is not equipped with the routing table control unit 150 serving as a functional block used for the output destination decision processing of the input header processing unit 101, the routing table memory 600, and the routing table CAM 500. Upon reception of the header information 25, the output header processing unit 102 performs the flow processing and transmits the flow information 26 to the packet transmission circuit 270.

When the header information 21 inputs into the input header processing unit 101, the header information store buffer 120 stores the information in an order of input for each input line. The header information store buffer 120, which received the BUSY signal (see that in FIG. 1, its illustration is omitted) indicating whether the circuit 110-*k* was doing the packet processing from the packet processing circuit 110-*k*, reads the earliest-arrived header information 21 and forwards it to the packet processing circuit 110-*k* that is not in the packet processing.

Figure 5:
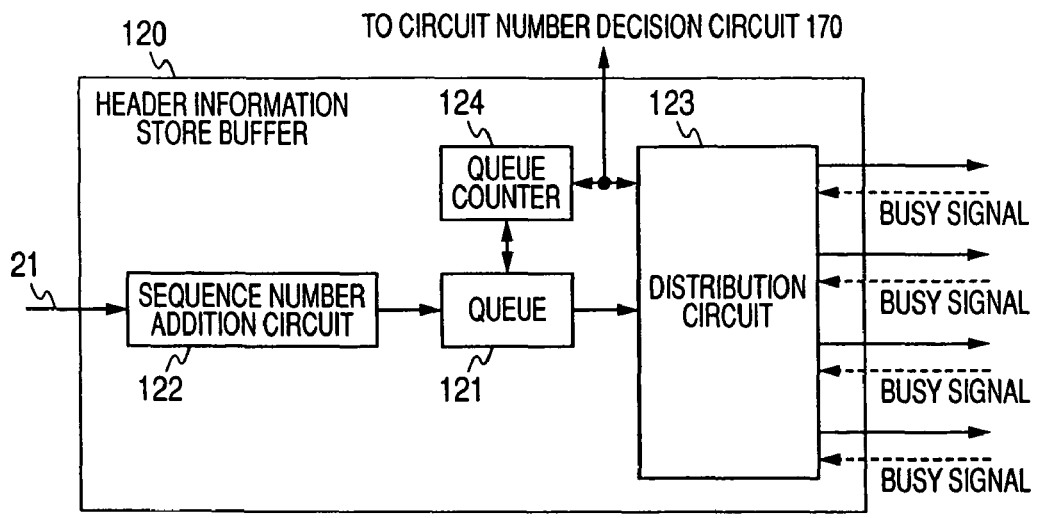
FIG. 5 is a diagram showing a configuration of a header information store buffer of the first embodiment.

FIG. 5 shows one implementation example of the header information store buffer 120. The buffer 120 described in FIG. 5 is constructed with a sequence number addition circuit 122, a queue 121, and a distribution circuit 123. The sequence number addition circuit 122 is equipped with a counter for each input line, and when the header information 21 is inputted, it will add a counter value corresponding to the input line number 331 in the header information 21 to the header information 21, and will transmit it to the queue 121. In this occasion, the counter value corresponding to the input line number 331 is counted up by unity. The queue 121 stores the received header information 21. The distribution circuit 123 is receiving the BUSY signal from the packet processing circuit 110-*k* and the number of packet processing circuits 110-*k* that are to be operated from the circuit number decision circuit 170. The number of circuits to be operated designates several operation states as follows: when the number of circuits is unity, only the packet processing circuit 110-1 is operating; when it is two, the processing circuits 110-1 and 110-2 are operating; when it is three, the processing circuits 110-1, 110-2, and 110-3 are operating; and when it is four, all the processing circuits 110-1 to 4 are operating. When there exist one or the plurality of packet processing circuits 110-$k$ that are in operation and do not transmit BUSY signals, the distribution circuit 123 transmits the header information 21 that is earliest stored in the queue 121 to one of the packet processing circuits 110-$k$.

<Output Destination Decision Processing>

The packet processing circuit 110-$k$ starts the output destination decision processing by transmitting DIP 312 and a routing table retrieval request to the routing table control unit 150. Upon reception of DIP 312 and the request, the routing table control unit 150 will transmit DIP 312 to the routing table CAM 500 as a retrieval key.

In order that the routing table control unit 150 selects one request when receiving the requests from the plurality of packet processing circuits 110-$k$, it is equipped with a counter capable of counting one to four. The counter value is reset to unity simultaneously with activation of the packet forwarding device 200. In the case where the request is received from the plurality of packet processing circuits 110-$k$, designating the counter value as A, the routing table control unit 150 selects a request of the packet processing circuit 110-A. If the request does not exist, the presence or absence of a request is checked sequentially for the packet processing circuit 110-(A+1), the packet processing circuit 110-(A+2), . . . . If it exists, the request will be selected. When it is decided that there is no request at the time of checking the presence or absence of the packet processing circuit 110-4, the flow returns to the packet processing circuit 110-1, and after this, a request to be selected will be searched sequentially for the packet processing circuit 110-(A+1), the packet processing circuit 110-(A+2), and so on. After having selected the request, the routing table control unit 150 will transmit DIP 312 corresponding to the request as the retrieval key to the routing table CAM 500. Further, the counter value is reset to a value "k+1" that is the counter value corresponding to the packet processing circuit 110-$k$ having transmitted the request added with unity.

Figure 1:
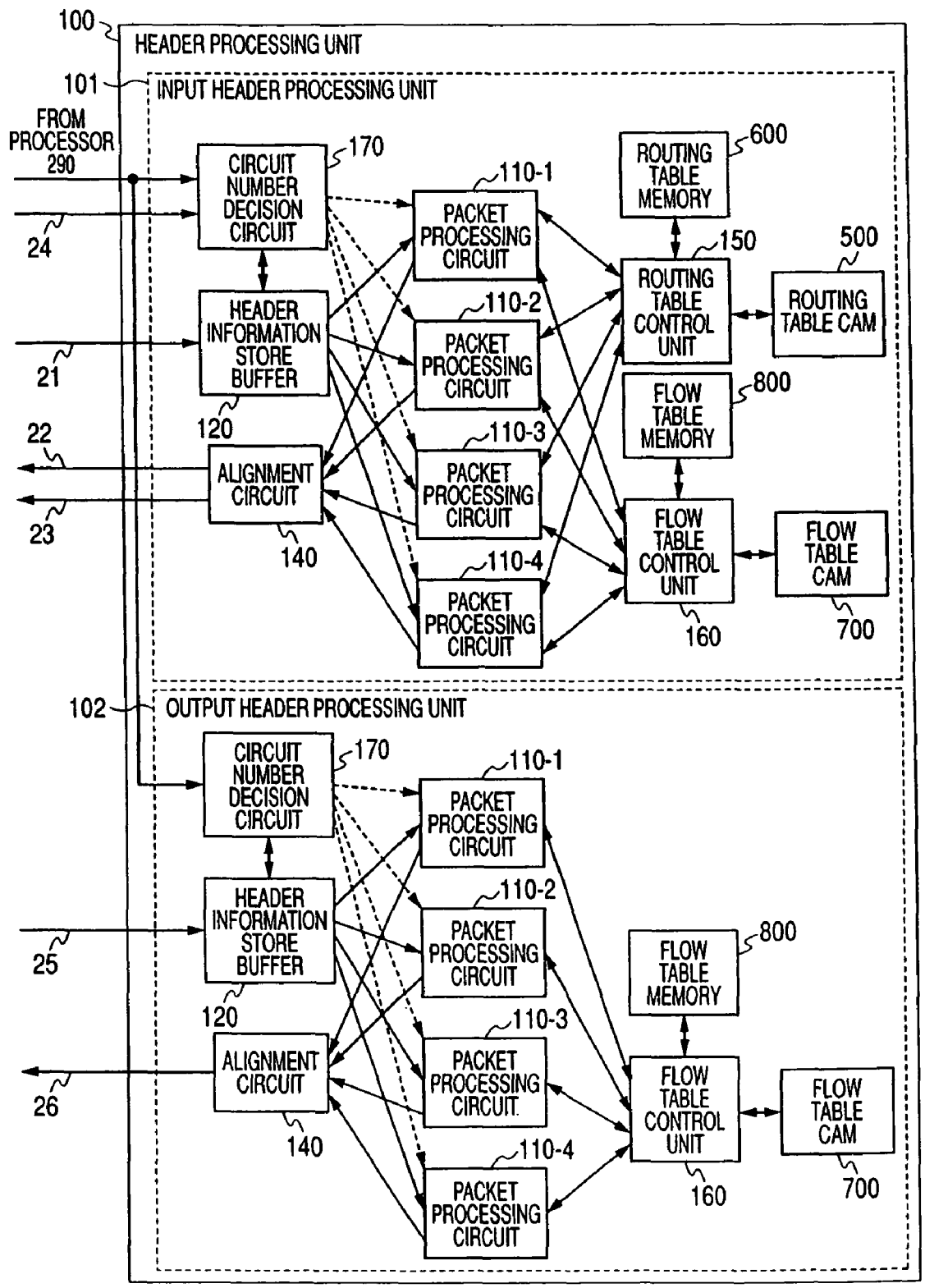
FIG. 1 is a diagram showing a configuration of a header processing unit in a first embodiment of the present invention.
Figure 6:
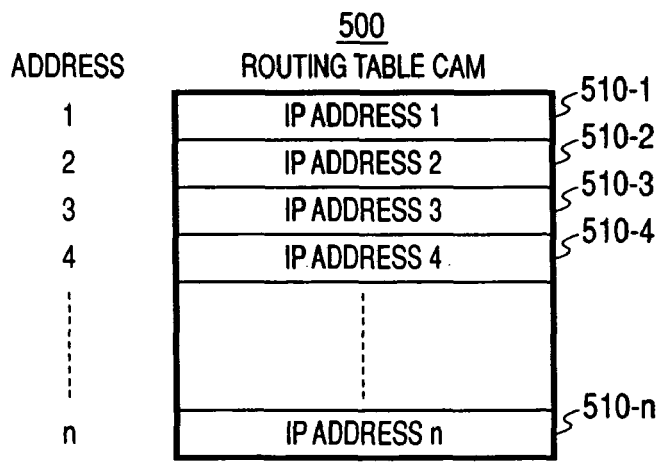
FIG. 6 is a diagram showing a format of a routing table CAM of the first embodiment.
Figure 7:
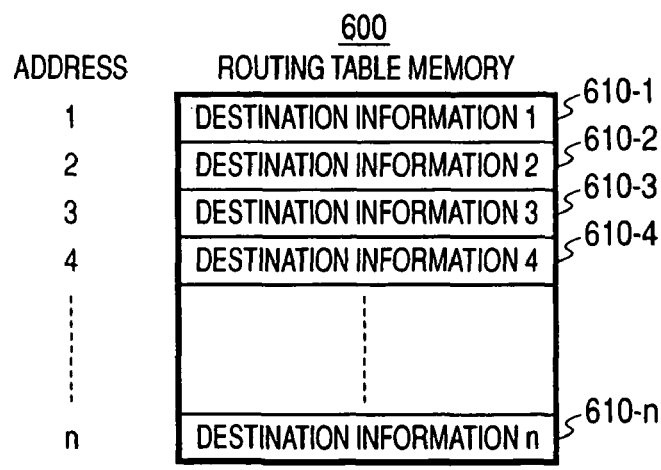
FIG. 7 is a diagram showing a format of routing table memory of the first embodiment.

FIG. 6 and FIG. 7 show one example of formats of the routing table CAM 500 and of the routing table memory 600 of FIG. 1, respectively. The routing table CAM 500 is equipped with a plurality of entries 510 showing conditions of DIP 312. The routing table memory 600 stores in the entry 610 the destination information of the packet having DIP 312 that coincides with the conditions described in the entry 510. The CAM 500 can store the conditions of DIP 312 with a mask (it shows that whatever value is all right).

Having received DIP 312, the routing table CAM 500 will compare DIP 312 and a value of the entry 510 for coincidence, and will transmit the smallest address value among addresses of the coincided entry 510 to the routing table control unit 150. The routing table control unit 150 transmits this address to the packet processing circuit 110-$k$ that transmitted the request. The packet processing circuit 110-$k$ that received the address value transmits the address value and a read request of the routing table memory 600 to the routing table control unit 150.

A selection operation of the request at the time of receiving read requests from the plurality of packet processing circuits 110-$k$ is the same as the case where a plurality of routing table retrieval requests are received. The routing table control unit 150 reads the destination information in the entry 610 of the routing table memory 600 using an address value corresponding to the selected read request, and transmits it to the packet processing circuit 110-$k$ that transmitted the information read request. The packet processing circuit 110-$k$ transmits the destination information as the output line number together with a sequence number to the alignment circuit 140.

<Flow Processing>

In the flow processing, the packet processing circuit 110-$k$ starts the flow processing by transmitting SIP 311, DIP 312, SPORT 313, DPORT 314, DSCP 315, SMAC 316, DMAC 317, UPRI 318 in the header information 21, and a flow table retrieval request to the flow table control unit 160. Upon reception of the request, the flow table control unit 160 will transmit SIP 311, DIP 312, SPORT 313, DPORT 314, DSCP 315, SMAC 316, DMAC 317, and UPRI 318 to the flow table CAM 700 as the retrieval key. Incidentally, a selection operation of the request at the time of receiving the request from the plurality of packet processing circuits 110-$k$ is the same as the operation of the routing table control unit 150.

FIG. 8 and FIG. 9 show formats of the flow table CAM 700 and of the flow table memory 800, respectively. The flow table CAM 700 is equipped with a plurality of entries 710 showing conditions of SIP 311, DIP 312, SPORT 313, DPORT 314, DSCP 315, SMAC 316, DMAC 317, and UPRI 318. The flow table memory 800 stores in an entry 810 the filter information, the QoS information, and the counter value of the packet having SIP 311, DIP 312, SPORT 313, DPORT 314, DSCP 315, SMAC 316, DMAC 317, and UPRI 318 that coincide with conditions described in the entry 710. The CAM 700 can store conditions added with a mask (it shows that whatever value is all right).

Upon reception the retrieval key, the flow table CAM 700 performs coincidence comparison with the entry 710, and transmits the smallest address value among addresses of the coincided entry 810 to the flow table control unit 160. The flow table control unit 160 transmits the address to the packet processing circuit 110-$k$ that transmitted the flow table retrieval request. The packet processing circuit 110-$k$ transmits the address and a read request of the flow table memory 800 to the flow table control unit 160. The flow table control unit 160 reads the filter information, the QoS information, and the counter value of the entry 810 described in the entry 810 of the flow table memory 800 corresponding to the address value, and transmits them to the packet processing circuit 110-$k$ that transmitted the read request. The packet processing circuit 110-$k$ counts the counter value by unity, and transmits the address value, the counter value, and a write request to the flow table control unit 160. The flow table control unit 160 writes the received counter value in the entry 810 of the flow table memory 800 corresponding to the address. Further, the packet processing circuit 110-$k$ transmits the received filter information and QoS information together with the sequence number to the alignment circuit 140.

The alignment circuit 140 rearranges a group of made up of the destination information, the filter information, and the QoS information that were received in an order of the sequence number for each input line, and transmits it. What makes this circuit necessary is a fact that, although the packets outputted from the header information store buffer 120 are processed in parallel by the four packet processing circuits 110-$k$, an order of the packets is likely to be changed due to differences in retrieval times of the tables etc.

FIG. 10 shows one implementation example of the alignment circuit 140. The alignment circuit of FIG. 10 is constructed with a header processing result transmission circuit 141, read circuits 142-$k$ (k=1 to 4) for respective input lines, alignment memory 143-$k$, an alignment memory distribution circuit 144, and read pointer store units 145-$k$ for respective input lines. Although FIG. 10 shows only the read pointer store unit 145-1 connected to the read circuit 142-1, the read pointer store units 144-2 to 4 corresponding to the read circuits 142-2 to 4 also exist.

FIG. 11 shows one implementation example of the alignment memory 143-$k$. The alignment memory 143-$k$ has 16 entries 145 each for storing the destination information, the filter information, and the QoS information. This number of the entries 145 needs to be larger than the number of output destination information corresponding to header information that another output destination information corresponding to another header information 21 inputted from the same line passes and reaches the alignment circuit 140, and needs to be larger than the number of flow information that another flow information corresponding to another header information 21 inputted from the same line passes and reaches the alignment circuit 140. Although this embodiment will be explained assuming that the number of these entries 143 to be 16, the operation can be performed similarly with other value.

When receiving the destination information from the packet processing circuit 110-$k$, the alignment memory distribution circuit 144 writes the destination information 23 in the entry 145 that corresponds to an address having low-order four bits of the sequence number among the entries 145 of the alignment memory 143-$k$ corresponding to the input line number. Similarly, the alignment memory distribution circuit 144 writes the filter information and the QoS information transmitted from the packet processing circuit 110-$k$ in the entry 145 that corresponds to an address having low-order four bits of the sequence number among the entries 145 of the alignment memory 143-$k$ corresponding to the input line number.

In the read pointer store unit 145-$k$, the address of the entry 145 of the alignment memory 143-$k$ to be read next for each input line is recorded. When the destination information, the filter information, and the QoS information have all been written in the entry 145 corresponding to the address, the read circuit 142-$k$ will read the entry 145, and will transmit it to the header processing result transmission circuit 141. The header processing result transmission circuit 141 transmits the output destination information, as the output line information 22, and transmits the filter information and the QoS information, as the flow information 23, to the packet receiving circuit 230.

Up to this paragraph, the operation when the input header processing unit 101 received the header information 21 was explained. When the output header processing unit 102 receives the header information 25, the header information store buffer 120 adds the sequence number to the header information 25 for each output line, and the alignment circuit 140 aligns the header information 25 so that an order in which the header information 25 is inputted is guaranteed. Further, the packet processing circuit 110-$k$ does not perform the output destination decision processing. The other operations than this are the same as the operations when the input header processing unit 101 receives the header information 21.

The alignment circuit 140 is equipped with the read circuit 142-$k$, the alignment memory 143-$k$, and the read pointer store unit 145-$k$ for each output line, and the alignment memory distribution circuit 144 will distribute the alignment memory 143-$k$ according to the output line. Further, the destination information of the alignment memory 143-$k$ does not exist. When the filter information and the QoS information are written in the entry 145, the header processing result transmission circuit 141 transmits the information as the flow information 26 to the packet transmission circuit 270.

The packet forwarding device 200 equipped with the header processing unit 100 of the first embodiment described above changes the number of the packet processing circuits 110-$k$ to be operated according to the number of connections of the input lines 201 and the output lines that are connected to the packet receiving circuit 230 and the packet transmission circuit 270, respectively. The input line 201-$ij$ and the output line 202-$ij$ form a group, and make a connection/non-connection in a unit of this group. Hereafter, the group of this input line 201-$ij$ and the output line 202-$ij$ is described as a line ij.

Here, an interface unit 210-1 capable of accommodating four lines 1$j$ ($j=1$ to 4) is considered. Processing performance of the four packet processing circuits 110-$k$ of the interface unit 210-1 matches a maximum value of the traffic that is inputted from the four lines 1$j$. Here, when the number of lines stored is A ($\leqq 4$), the "A" packet processing circuits 110 operate.

Figure 18:
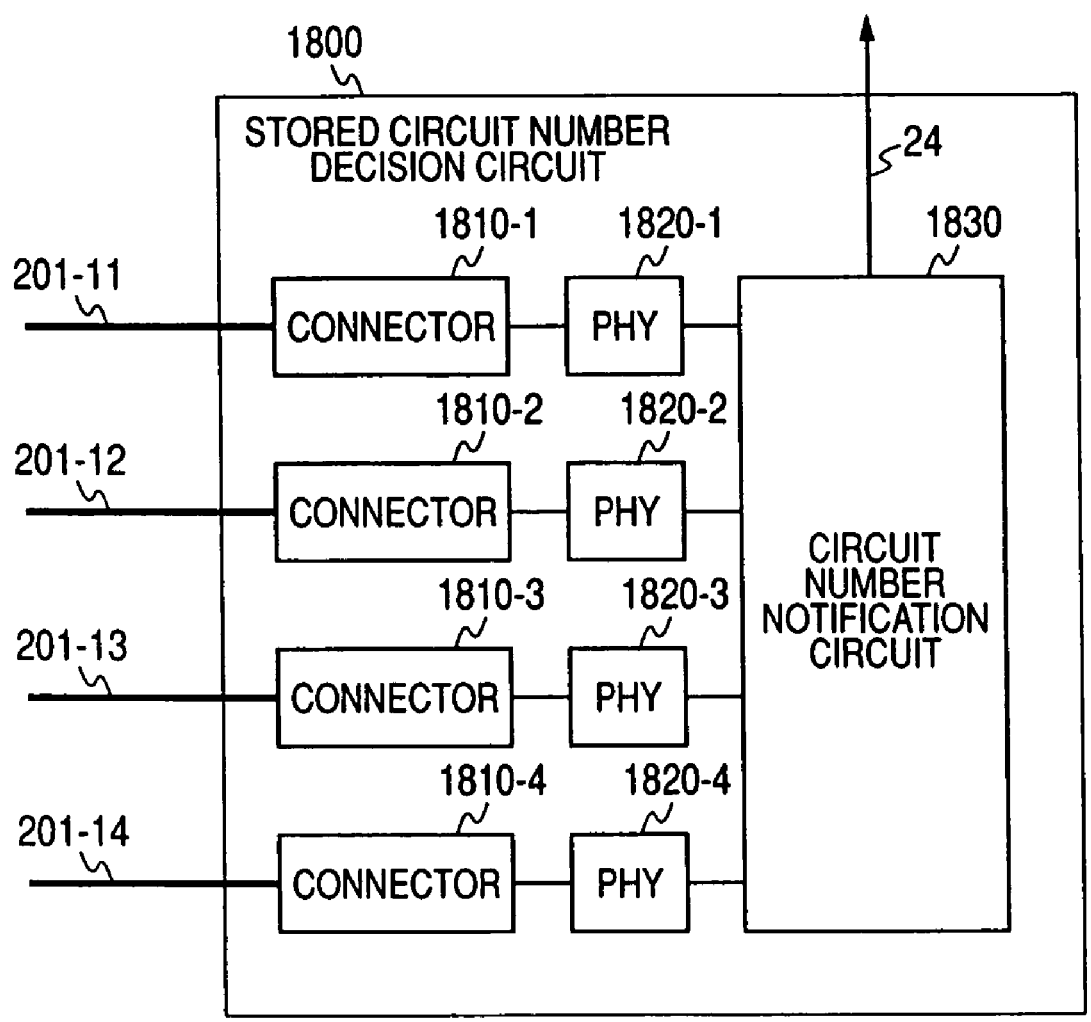
FIG. 18 is a diagram showing one configuration example of an accommodated line number decision circuit that is a part of the packet receiving circuit of the first embodiment.

This number of lines is notified by means of the line number information 24 that the packet receiving circuit 230 transmits. The packet receiving circuit 230 is of a configuration of the usual receiving circuit added with a circuit for deciding the number of accommodated lines to its interface unit. FIG. 18 shows an accommodated line number decision circuit 1800 with which the interface unit 210-1 of the packet receiving circuit 230 is equipped. This decision circuit 1800 is constructed with input lines 201-1$j$ ($j=1$ to 4), four connectors 1810-$j$ for connecting the input lines 201-1$j$, PHY 1820-$j$ matching the connector for terminating a physical layer that is the first layer of an OSI reference model, and a circuit number notification circuit 1830. Although FIG. 18 describes a case where the four input lines 201-1$j$ are connected, a part or the whole of the input lines 201-1$j$ may not be connected.

When the input line 201-1$j$ is connected, PHY 1820-$j$ receives data transmitted by other packet forwarding device or a terminal that are connected by the input line 201-1$j$, and decides the presence or absence of connection of the input line 201-1$j$ by analyzing contents of the data. Further, it transmits the decision result to the circuit number notification circuit 1830. The circuit number notification circuit 1830 decides the number of PHY's 1820-$j$ that transmit information "presence" of the decision result, and transmits the number as the line number information 24 to the header processing unit 100.

For reception-side processing of the input processing unit 101 that is performed according to the header information 21, the line number information 24 is used. The circuit number decision circuit 170 that received the line number information decides the number of circuits of the packet processing circuits 110-$k$ to be operated, and notifies the header information store buffer 120 of it. The distribution circuit 123 of the header information store buffer 120 forwards the header information 21 or 25 to the packet processing circuits 110-1 to A in operation that are estimated from the notified number of circuits A. That is, it performs the forwarding as follows: when the number of circuits A is unity, it transmits to the packet processing circuit 110-1; when A is two, it does to the packet processing circuits 110-1 and 110-2; when A is three, it does to the packet processing circuits 110-1, 110-2, and 110-3; and when A is four, it does to all the packet processing circuits 110-1 to 4.

Further, the circuit number decision circuit 170 sends a packet processing signal to the packet processing circuit 110-$k$ that is to be operated, and sends a packet processing stop signal to the packet processing circuit 110-$k$ whose packet processing operation is to be stopped. (These signals are shown by broken line arrows starting from the circuit number decision circuit 170 and ending at the respective packet processing circuits 110 collectively.) The packet processing circuit 110-$k$ that is receiving the packet processing signal performs the packet processing, while the packet processing circuit 110-$k$ that is receiving the packet processing stop signal stops the packet processing. As means of stopping the packet processing, for example, shutting off a power supply of the packet processing circuit 110-$k$ and stopping a clock are conceivable. However, other means may be used.

The above-mentioned distribution operation and stop operation enable provision of the packet forwarding device such that a total of the electric powers of the packet processing circuits 110-$k$ for performing the packet processing becomes the electric power that accords to the number of lines being accommodated.

In the above, the case where the interface unit 210-1 whose lines ij are four has the four packet processing circuits 110-$k$ was described. When the number of accommodated lines ij or the number of the packet processing circuits 110-$k$ is different, what is necessary is just to follow the formula below and decide the number of circuits to be operated.

Number of lines to be operated=Number of lines ij in connection/Number of accommodatable lines ij×Number of packet processing circuits.

Figure 19:
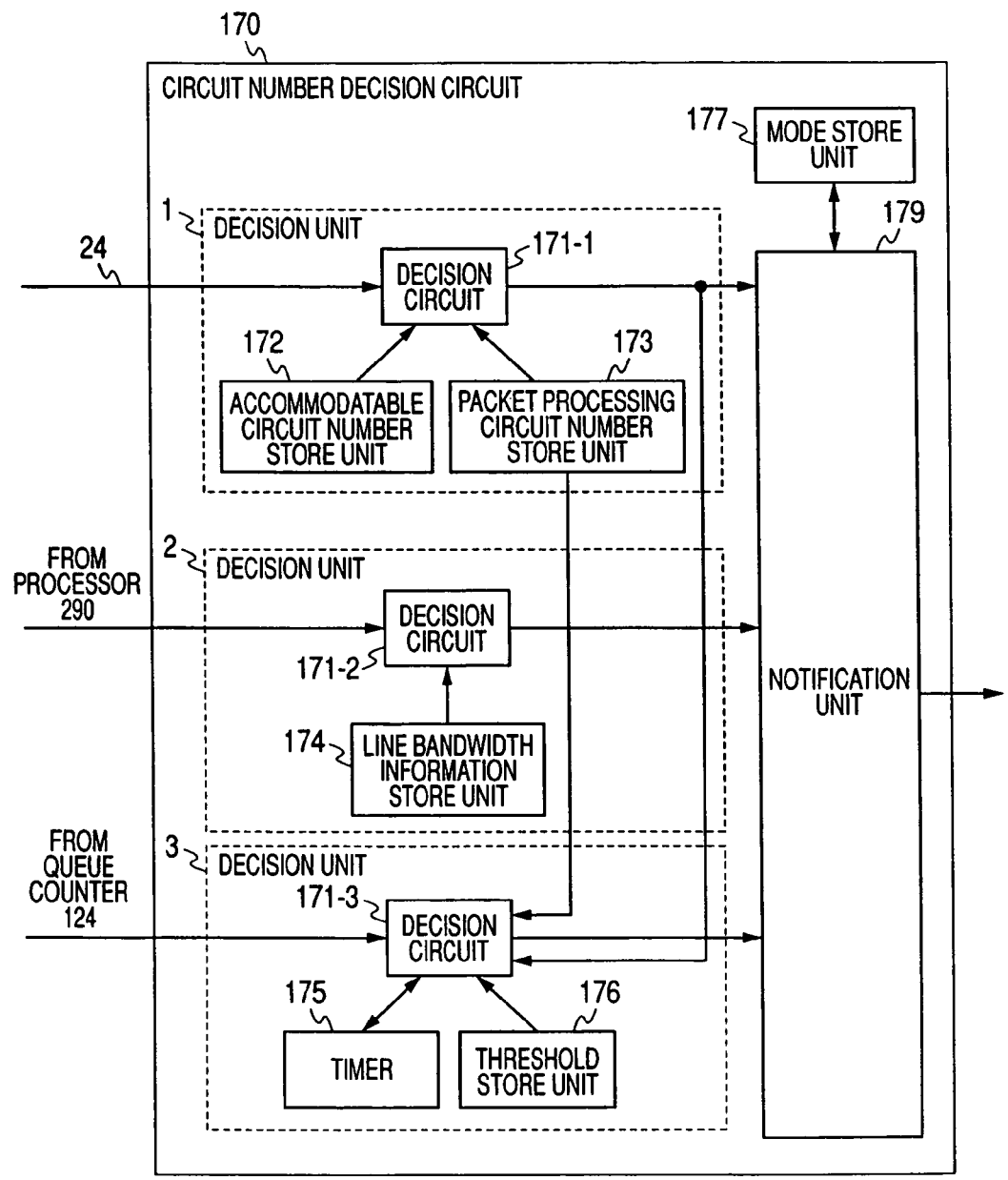
FIG. 19 is a diagram showing one configuration example of a line number decision circuit of the first embodiment.

Next, FIG. 19 shows a detailed block diagram of one configuration example of the circuit number decision circuit 170. The decision circuit 170 is constructed with decision units 1 to 3, a notification unit 179, and a mode store unit 177. Although, this figure shows that only a decision circuit 171-2 of the decision unit 2 is connected to the processor 290, functional blocks 172 to 177 are also connected to the processor 290.

Decision of the number of circuits based on the above-mentioned formula is made by the decision unit 1. Upon reception of the line number information 24, a decision circuit 171-1 reads the numbers of accommodatable lines ij and the number of packet processing circuits that are individually stored in the accommodatable circuit number store unit 172 and the packet processing circuit number store unit 173, respectively, decides the number of circuits to be operated based on the above-mentioned formula, and transmits it to the notification unit 179. Setup of the store units 172 and 173 is performed by the control terminal 10 via the processor 290. The notification unit 179 notifies the number of circuits to the header information store buffer 120. It also sends a packet processing signal to the packet processing circuit 110-$k$ that is made to operate as described above and sends a packet processing stop signal to the packet processing circuit 110-$k$ that is made to stop the packet processing operation. The decision units 2 and 3 will be described later.

Figure 12:
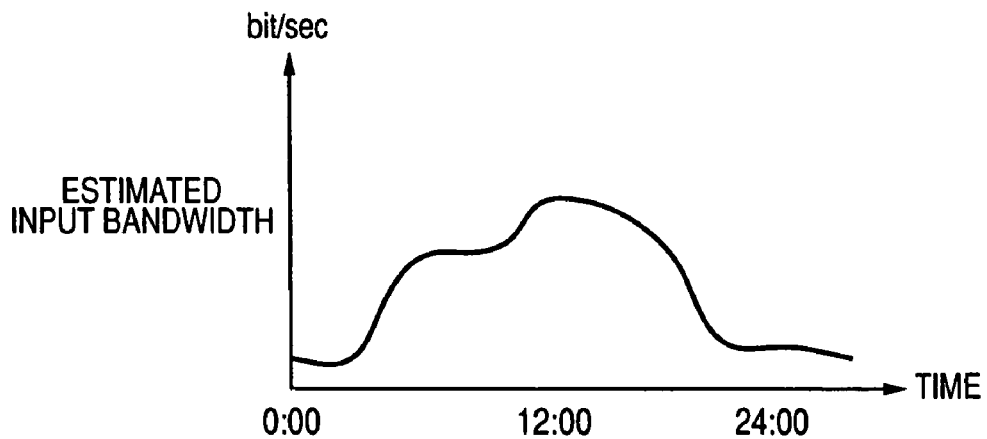
FIG. 12 is a diagram showing temporal variation of an estimated input bandwidth inputted from a control terminal of the first embodiment.

As another method for changing the number of packet processing circuit 110-$k$, a method for informing estimated input and output bandwidths of the packet from the control terminal 10 of the outside to the circuit number decision circuit 170 via the processor 290 is conceivable. In doing this, the circuit number decision circuit 170 decides the number of packet processing circuits 110-$k$ that are made to operate based on the estimated input bandwidth. Here, the interface unit 210-1 capable of accommodating the four lines $1j$ (j=1 to 4) is considered. Processing performance of the four packet processing circuits 110-$k$ of this interface unit 210-1 coincides with a maximum value of traffic inputted from the four lines $1j$. In this occasion, the circuit number decision circuit 170 of the input header processing unit 101 decides the number of lines as follows: when an estimated input bandwidth is 0% to not more than 25% of the total of the line bandwidths of the four lines ij, the number of the packet processing circuits 110-$k$ is unity; when it exceeds 25% and not more than 50%, it is two; when it exceeds 50% and not more than 75%, it is three; and when it exceeds 75%, it is four. The circuit number decision circuit 170 of the output header processing unit 102 also performs the same decision to an estimated output bandwidth. The estimated input bandwidth and output bandwidth may vary to time. For example, as described in FIG. 12, it is conceivable that the estimated input bandwidth shown as a solid line is notified to the packet forwarding device 200 at each time.

Decision of the number of circuits in doing this is performed in the decision unit 2 of the circuit number decision circuit 170 of FIG. 19. The decision circuit 171-2 with which the decision unit 2 is equipped decides the number of the processing circuits 110-$k$ from the total of the estimated bandwidth notified through the processor 290 and the line bandwidth stored in a line bandwidth information store unit 174, and transmits it to the notification unit 179. Incidentally, setup of the store unit 174 is performed by the control terminal 10 through the processor 290. The notification unit 179 notifies the header information store buffer 120 of the number of circuits. It also sends a packet processing signal to the packet processing circuit 110-$k$ that is to be operated and sends a packet processing stop signal to the packet processing circuit 110-$k$ whose packet processing operation is to be stopped. The number of processing circuits will be inputted into the notification unit 179 from the decision units 1 and 2 and the decision unit 3 that will be described later. The notification unit 179 is equipped with the mode store unit 177, and will select one piece of information from among a plurality of pieces of processing circuit number information based on a value in this store unit 177 and will send it. Setup of the store unit 177 will be performed by the control terminal 10 via the processor 290.

As another method for changing the number of the packet processing circuits 110-$k$, a method where the circuit number decision circuit 170 decides the number of the packet processing circuits 110-$k$ that are to be operated by referring to information on the traffic volume that the packet forwarding device 200 transmits/receives and other information related to the traffic volume is conceivable. For example, the number of circuits is decided based on a value QLEN (information of the number of stored pieces of the header information) of a queue counter 124 of the queue 121 with which the header information store buffer 120 is equipped. The circuit number decision circuit 170 is equipped with a timer (timer value: T), a threshold of T: Tmax, and two thresholds of the queue: THRmin and THRmax (THRmin<THRmax). When a time at which the number of pieces of the header information 21 or 25 stored in the queue 121 becomes less than THRmin reaches or excesses Tmax, the circuit number decision circuit 170 reduces N by unity; when a time at which the number of pieces of the header information 21 or 25 becomes more than or equal to THRmax, it increases N by unity.

Figure 13:
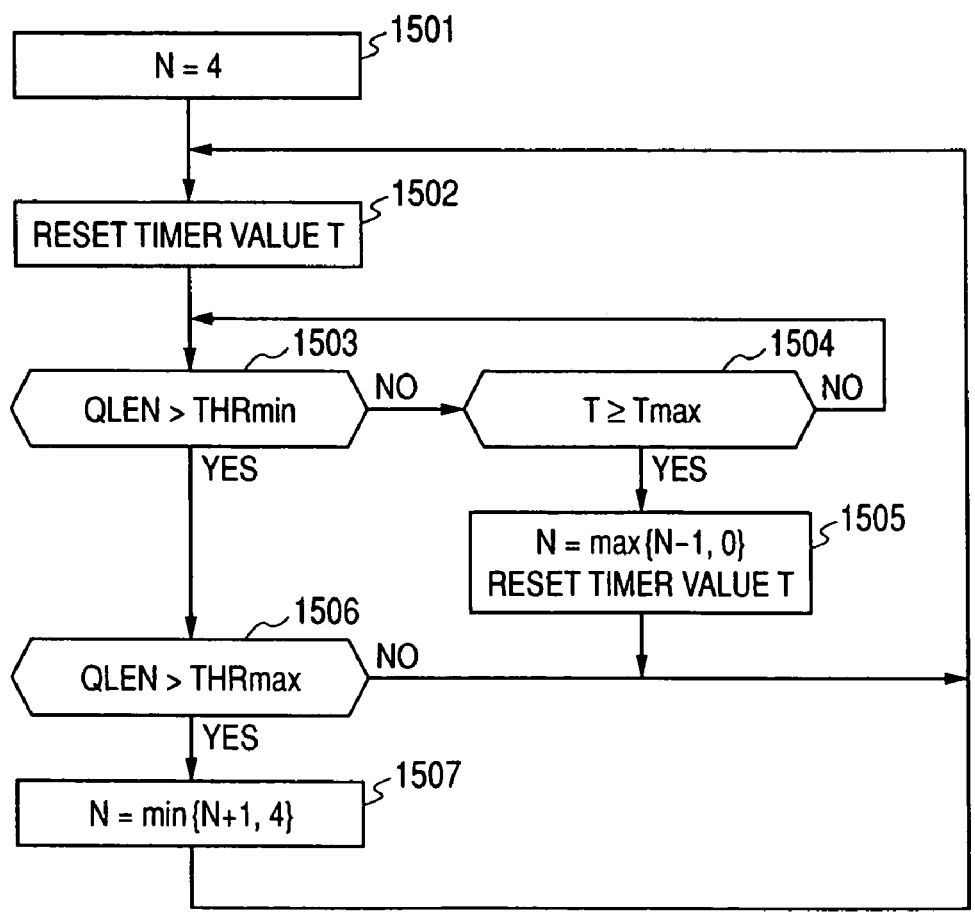
FIG. 13 is a diagram showing a flow chart of a circuit number decision circuit 170 of the first embodiment.

Below, details will be explained using a flow chart of FIG. 13 and the circuit number decision circuit 170 (mainly the decision unit 3). Here, the interface unit 210-1 capable of accommodating the four lines $1j$ (j=1 to 4) is considered. Incidentally, values of THRmin, THRmax, and Tmax are set in a threshold store unit 176 of FIG. 19 by the control terminal 10 via the processor 290.

First, a decision circuit 171-3 of the decision unit 3 initializes the number of circuits N with which itself is equipped to four stored in the packet processing circuit number store unit 173 (Step 1501), and resets the value T of the timer 175 to zero (Step 1502). Next, the value QLEN of the queue counter 124 is compared with THRmin in the threshold store unit 176

(Step 1503), and if QLEN≦THRmin stands, T and Tmax in the threshold store unit 176 are compared (Step 1504). If the comparison result shows T≧Tmax and QLEN is under THRmin during the time Tmax or more, the number of circuits N will be decreased by unity (Step 1505), and the flow will return to Step 1502, where T will be reset to zero. Incidentally, if N becomes a negative value in Step 1505, N will be corrected to zero. If the comparison result shows T<Tmax, Step 1503 will be performed again. If QLEN>THRmax stands in Step 1503, QLEN and THRmax in the threshold store unit 176 will be compared (Step 1506). If QLEN>THRmax stands and excessive header information 21 is stored, N will be increased by unity (Step 1507) and the flow will return to Step 1502, where T will be reset to zero. If QLEN≦THRmax stands and excessive header information 21 is not stored, the flow will return to Step 1502, where T will be reset to zero. Incidentally, if in Step 1507, N becomes five or more, being larger than four that is a value of the packet processing circuit number store unit 173, N will be corrected to four. After the decision circuit 171-3 performs the operations described above, it sends the number of circuits N to the notification unit 179 simultaneously. The notification unit 179 notifies the header information store buffer 120 of the number of circuits, and sends a packet processing signal to the packet processing circuit 110-k that is to be operated and a processing stop signal to the packet processing circuit 110-k whose operation of packet processing is to be stopped (a broken line arrow of FIG. 1).

The number of the packet processing circuits is decided and/or the number of the packet processing circuits is decided by referring to a storage state of the queue 121 of the packet forwarding device 200 according to the estimated input bandwidth or estimated output bandwidth that the above-mentioned external control terminal 10 notifies, whereby it becomes possible to provide a packet forwarding device that is the object of this embodiment and such that the total of the electric powers of the packet processing circuits 110-k performing the packet processing becomes the electric power that accords to the input bandwidth or output bandwidth of the packet.

Further, this embodiment can also provide a packet forwarding device whose electric power becomes one that accords to both the number of lines being accommodated and the bandwidth. When the control terminal 10 notifies of the estimated input bandwidth or estimated output bandwidth, what is necessary is just that the control terminal 10 notifies the circuit number decision circuit 170 of the bandwidth of the packet that is inputted or outputted into/from the line ij being accommodated by the packet receiving circuit 230 or packet transmission circuit 270 as the estimated input bandwidth or estimated output bandwidth. In a case where the number of lines is decided by referring to a storage state of the queue 121, what is necessary is just to consider a maximum value of the number N of packet processing circuits 110-k that are operated by the circuit number decision circuit 170 as a value notified by means of line number information 24.

In the case of deciding the number of circuits based on the number of lines to be accommodated and a storage state of the queue 121, what is necessary is for the decision circuit 171-3 of the decision unit 3 just to use the number of processing circuits 110-k outputted from the decision circuit 171-1 instead of the number of processing circuits (in FIG. 13, four) of the store unit 173 used in Step 1501 and Step 1507 described above. In this occasion, a value showing the number of circuits of the decision circuit 171-3 will be recorded in the mode store unit 177.

A power-saving measure of the header processing unit 100 will be explained. The header processing unit 100 is composed of the input header processing unit 101 and the output header processing unit 102. This is because to separate the packet processing circuit 110-k used at the time of receiving the header information 21 (at the time of packet reception) and the packet processing circuit 110-k used at the time of receiving header information 25 (at the time of packet transmission). By separating the packet processing circuits 110-k, it becomes possible to, when the header information 21 or 25 inputs, make only the packet processing circuit 110-k corresponding to the header information operate. In the case where the packet processing circuits 110-k at the time of packet reception and at the time of packet transmission are realized with one packet processing circuit, it is necessary to make the circuit for the time of transmission also operate at the time of packet reception and to make the circuit for the time of reception also operate at the time of packet transmission.

Second Embodiment

As a second embodiment, a case where a packet processing circuit of the output destination decision processing and the flow processing is divided will be explained.

In this embodiment, as a measure of power saving of the header processing unit 100, the packet forwarding device takes a configuration where individual packet processing circuits perform the output destination decision processing and the flow processing of the input header processing unit 101, respectively. Since in the case where a packet not needing for the flow processing exists, this configuration can reduce the circuits for the flow processing that are to be operated, further reduction of electric power becomes possible.

Figure 16:
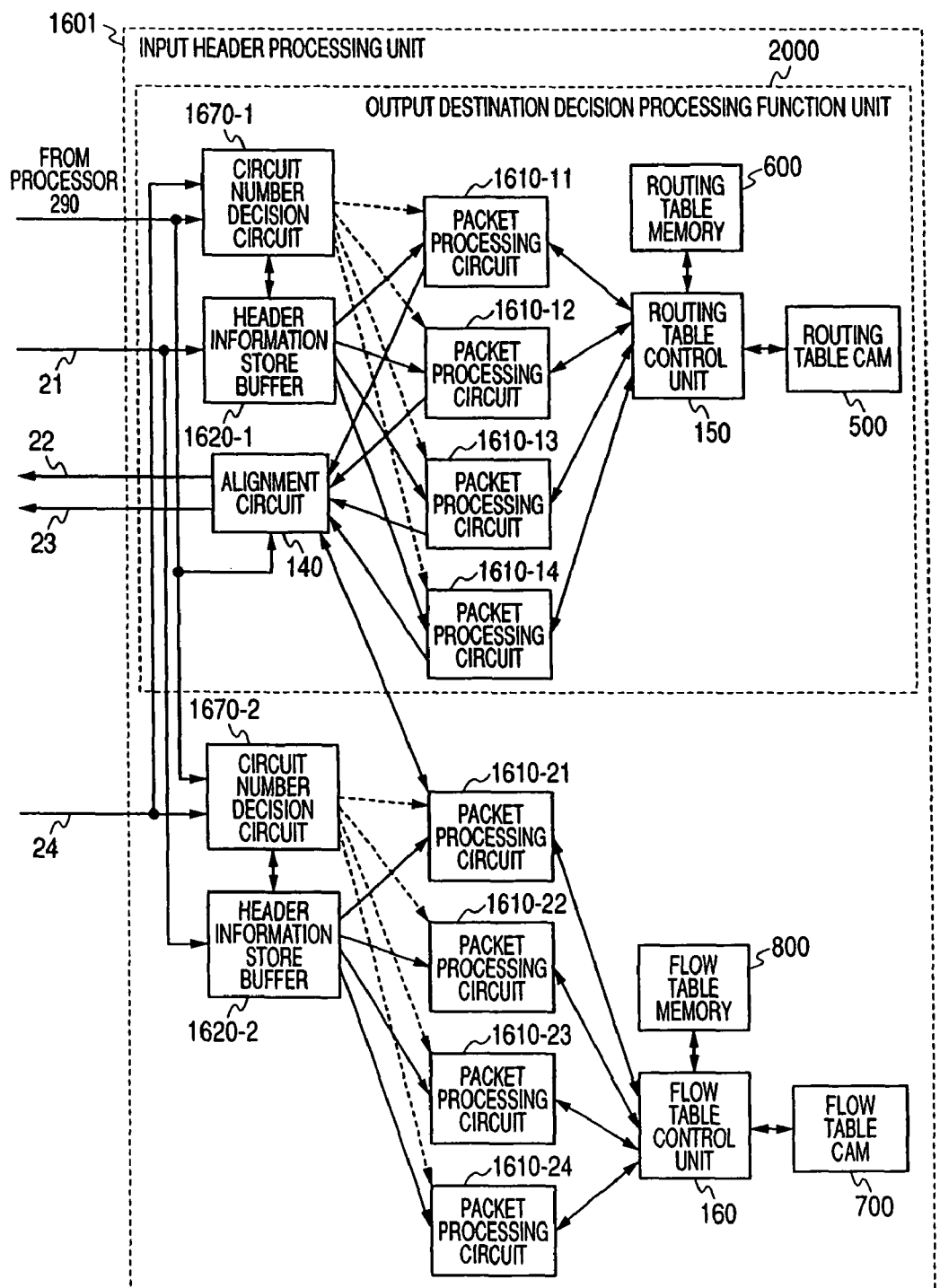
FIG. 16 is a block diagram of an input header processing unit 1601 of a second embodiment.

FIG. 16 shows a configuration of an input header processing unit 1601 of the second embodiment. The input header processing unit 1601 has the configuration where the packet processing circuit 110-k of FIG. 1 is divided into a packet processing circuit 1610-1k for performing the output destination decision processing and a packet processing circuit 1610-2k for performing the flow processing. The header information store buffer 120 is also divided into a header information store buffer 1620-1 for the output destination decision processing and a header information store buffer 1620-2 for the flow processing; the circuit number decision circuit 170 is also divided into a circuit number decision circuit 1670-1 for the output destination decision processing and a circuit number decision circuit 1670-2 for the flow processing. The routing table control unit 150 and the flow table control unit 160 are connected to the packet processing circuit 1610-1k and the packet processing circuit 1610-2k, respectively. Although the alignment circuit 140 remains only one circuit, the circuit will be connected with all the packet processing circuits 1610. Incidentally, connections between the alignment circuit 140 and the packet processing circuits 1610-22 to 24 are omitted since otherwise the drawings become complicated.

The header information store buffers 1620-1 and 2 store the header information 21 after adding the sequence number to it, similarly with the first embodiment, and transmit the header information 21 and the sequence number to the packet processing circuits 1610-1k and 1610-2k, respectively. In doing this, the packet processing circuit 1610 to which the information is transmitted is a packet processing circuit 1610 that is in operation and did not receive a BUSY signal (whose illustration is omitted in FIG. 16).

Similarly with the above-mentioned embodiment, the packet processing circuit 1610-1k performs the output destination decision processing using the routing table control unit 150, the routing table CAM 500, and the routing table memory 600, and transmits the destination information and the sequence number to the alignment circuit 140. Similarly with the above-mentioned embodiment, the packet processing circuit 1610-2$k$ performs the flow processing using the flow table control unit 160, the flow table CAM 700, and the flow table memory 800, and transmits the filter information, the QoS information, and the sequence number to the alignment circuit 140. The alignment circuit 140 rearranges a group of information made up of the destination information, the filter information, and the QoS information that were received in an order of the sequence number, similarly with the above-mentioned embodiment, and transmits it.

In the input header processing unit 1601, if there is no need for performing the flow processing to all the packets, the control terminal 10 notifies the circuit number decision circuit 1670-2 and the alignment circuit 140 via the processor 290 in advance, and the circuit number decision circuit 1670-2 stops operations of the entire packet processing circuits 1610-2$k$. In the alignment circuit 140, it becomes possible for the output line information 22 and the flow information 23 to be transmitted at a time when only pieces of the destination information are ready. The QoS information of the flow information 23 becomes an arbitrary fixed value, and the filter information becomes "forwarding."

In this way, when there is no need for performing the flow processing to all the packets, the input header processing unit 1601 of this embodiment can stop operations of the packet processing circuit 1610-2$k$ that does not need to operate, and thus can realize further reduction of power consumption.

When the presence or absence of the flow processing is decided for each packet, the control terminal 10 may notify independently the estimated input bandwidths of the output destination decision processing and of the flow processing to the circuit number decision circuits 1670-1 and 2, respectively, via the processor 290. In the above-mentioned packet processing circuit 110, since a circuit for the flow processing operates to all the packets, when the packet not needing for the flow processing exists, it will make a useless circuit operate, so that idle electric power will, be consumed. On the contrary, in the input header processing unit 1610 of this embodiment, the control terminal 10 notifies the circuit number decision circuits 1670-1 and 2 of the estimated input bandwidth that is optimal to each processing, and each of these circuits decides the number of the packet processing circuits 1610 based on this bandwidth, and thereby the operations of the circuit for the flow processing not needing to operate can be reduced. For this reason, it becomes possible to realize further reduction of the electric power.

The packet receiving circuit 230 in this occasion decides an operation/stop of the flow processing for each packet based on the header unit 310 or the input line number 331, and transmits the header information 21 to the header processing unit 100 after adding the presence or absence of the flow processing to it. For example, the header processing unit 100 can perform such processing that the flow processing from the input line 201 whose input line number 331 is odd is performed while the flow processing from the input line 201 that is even is not performed by referring to the input line number 331. Further, by referring to the source IP address 311 and the destination IP address 312, the presence or absence of the flow processing can be decided for each source terminal or destination terminal.

When the presence or absence of the flow processing is "presence," the header information store buffer 1620-2 transmits the header information 21 to the packet processing circuit 1610-2$k$ as usual, whereas when the presence or absence of the flow processing is "absence," it discards the header information 21 and will not perform the flow processing. Simultaneously with this discard, the header information store buffer 1620-2 transmits the sequence number, the QoS information that was set to an arbitrary fixed value, and the filter information showing "forwarding" to the alignment circuit 140. Instead of information transmitted from the packet processing circuit 1610-2$k$, the alignment circuit 140 performs alignment and transmission of the flow information 23 by using these pieces of information.

Instead of deciding the number of the packet processing circuits 1610-2$k$ from the estimated input bandwidth notified by the control terminal 10, the circuit number decision circuit 1670-2 may decide the number of circuits to be operated based on the value QLEN (information of the number of stored pieces of the header information) of the queue counter 124 of the queue 121 with which the header information store buffer 1620-2 is equipped. In this case, if many pieces of the header information 21 having no need for the flow processing are inputted, a processing load of the packet processing circuit 1610-2$k$ for the flow processing will become low, and the circuit number decision circuit 1670-2 will reduce the number of the packet processing circuits 1610-2$k$ to be operated. Although in the conventional input header processing unit 101, it is necessary to equalize a circuit for output destination decision and the circuit for the flow processing in terms of performance; when there exists a packet that is not subjected to the flow processing, electric power can further be reduced in the input header processing unit 1601 of this embodiment, since the number of the packet processing circuits 1610-2$k$ to be operated can be reduced.

Third Embodiment

Next, an embodiment at the time of performing the output destination decision by DMAC will be explained as a third embodiment.

Up to this paragraph, it was considered that the destination information is decided based on DIP 312 in the output destination decision processing. However, since a L3 switch decides the destination information by DIP 312 or DMAC 317 according to the packet, in order to realize the L3 switch, a function unit for deciding the destination information by DMAC 317 is required to be newly provided.

Figure 17:
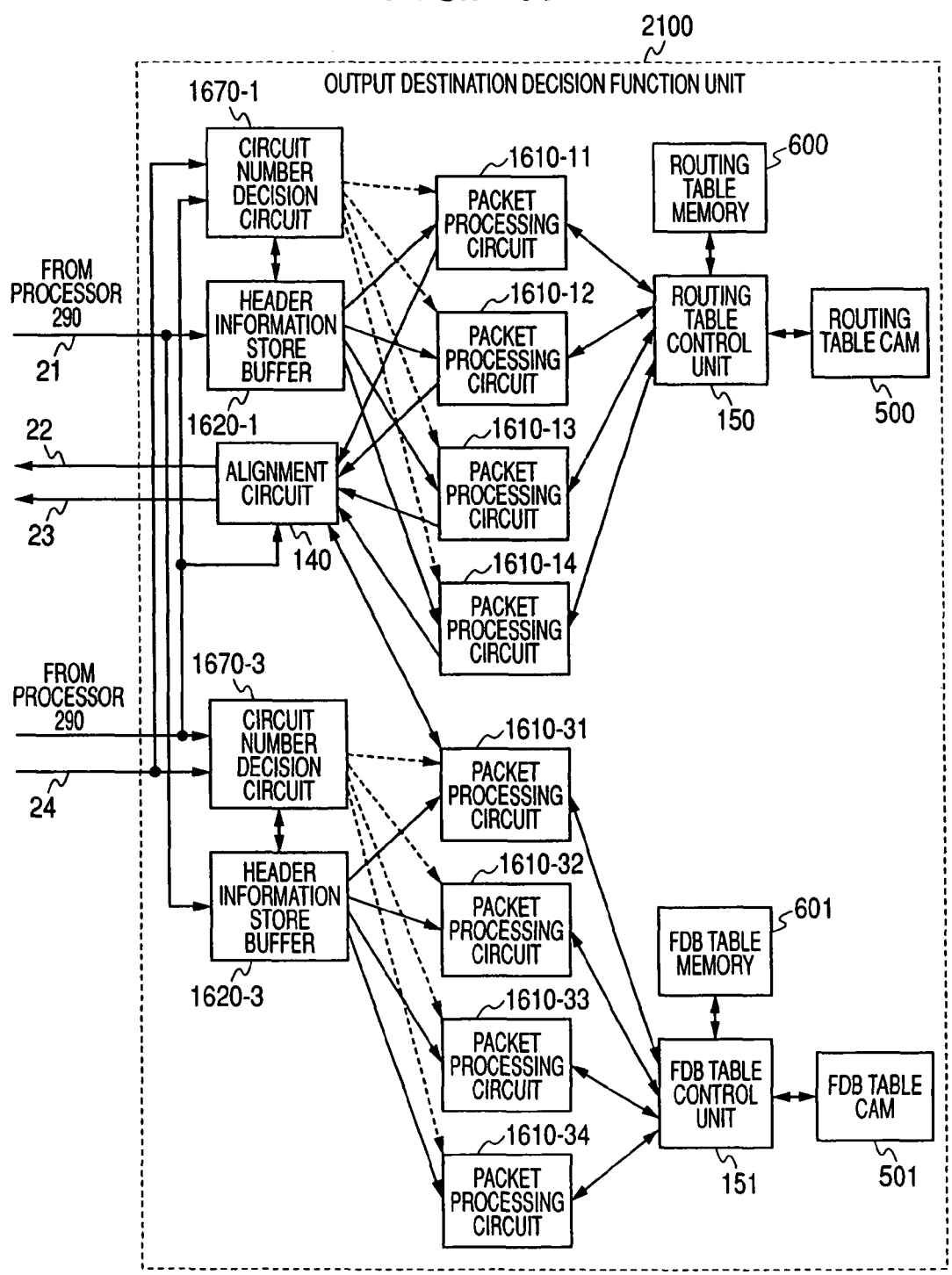
FIG. 17 is a diagram showing a configuration of an output destination decision processing function unit 2100 of a third embodiment.

FIG. 17 shows an output destination decision processing function unit 2100 obtained by adding an output destination decision processing function by DMAC 317 to an output decision processing function unit 2000 indicated by a broken line of FIG. 16. In order that the output destination decision processing function unit 2100 of FIG. 17 performs the output destination decision processing by DMAC 317, it is newly added with a packet processing circuit 1610-3$k$, an FDB table control unit 151, FDB table memory 601, an FDB table CAM 501, a circuit number decision circuit 1670-3, and a header information store buffer 1620-3.

The FDB table CAM 501 is the same as the routing table CAM 500 except that conditions of DMAC 317 are set up instead of the conditions of DIP 312, and formats of the FDB table memory 601 and of the routing table memory 600 are the same. Moreover, the operation of the packet processing circuit 1610-3$k$ is the same as that of the packet processing circuit 1610-$k$ except that the output destination decision is performed by DMAC 317 instead of DIP 312, and the operation of the circuit number decision circuit 1670-3 is the same as that of the circuit number decision circuit 1670-1. Furthermore, the alignment circuit 140 will align the destination information received from the packet processing circuit 1610-3k in addition to the packet processing circuit 1610-1k, and will transmit it. Incidentally, although the alignment circuit 140 of FIG. 17 is connected with the packet processing circuit 1610-3k like FIG. 16, the connection is omitted because otherwise the drawing would be complicated.

When the output destination decision processing is performed for all the packets using DIP 312, the control terminal 10 notifies the circuit number decision circuit 1670-3 of the processing in advance via the processor 290, and the circuit number decision circuit 1670-3 stops the operations of all the packet processing circuits 1610-3k. On the other hand, in the case where the output destination processing is performed using DMAC 317 for all the packets, the control terminal 10 notifies the circuit number decision circuit 1670-1 of that via the processor 290 in advance, and the circuit number decision circuit 1670-1 makes all the packet processing circuits 1610-1k stop their operations.

On the other hand, when the information (DIP 312 through DMAC 317) used for the output destination decision for each packet changes, the estimated input bandwidth of the packet may be notified by the external control terminal 10 via the processor 290. In this occasion, the control terminal 10 will notify individually the circuit number decision circuits 1670-1 and 3 of the estimated input bandwidths of the output destination decision processing by DIP 312 and of the output destination decision processing by DMAC 317, respectively. The decision processing of the number of the packet processing circuits 1610 and the processing regarding operation/stop of the circuit 1610 based on notified information that the circuit number decision circuits 1670-1 and 3 performed are as described above.

In this occasion, the following operations are newly added. The packet receiving circuit 230 decides the information used for the output destination decision for each packet based on the header unit 310 or the input line number 331, and transmits the header information 21 added with this information to the header processing unit 10. The header information store buffers 1620-1 and 3 of the header processing unit 100, when using information corresponding to the respective buffers for the output destination decision, transmits the header information 21 to the packet processing circuit 1610 as usual. On the other hand, if it is not used, the header information 21 will be discarded.

Instead of such notification of the estimated input bandwidth by the control terminal 10, the circuit number decision circuit 1670-1 or 3 may decide the number of circuits based on the value QLEN (information of the number of stored pieces of the header information) of the queue counter 124 of the queue 121 with which the header information store buffers 1670-1 and 3 are equipped. The operations of the circuit number decision circuits 1670-1 and 3 in this occasion are the same as the operation of the circuit number decision circuit 170 described above.

Below, superior points of this output destination decision processing function unit 2100 will be explained. A case where a circuit for the output destination decision processing by DMAC 317 is added to the conventional packet processing circuit 1610-1k is considered. In this occasion, since all the circuits for the output destination decision are always operating, there is a problem that one circuit not needing to operate will operate uselessly. On the other hand, since the output destination decision processing function unit 2000 can stop the packet processing circuit 1610 that is not in use by newly providing a packet processing circuit 1610-3k for performing the output destination decision processing by DMAC 317, no useless electric power is produced.

Although the embodiment in performing additionally the output destination decision processing by DMAC 317 was described in the foregoing, a case where the output destination decision processing for multicasting is performed using DIP 312 and SIP 311 is also the same. What is necessary to do this is just to add the packet processing circuit for performing the output destination decision processing by DIP 312 and SIP 311 instead of addition of the packet processing circuit for performing the output destination decision processing by DMAC 317 of this embodiment.

Fourth Embodiment

Next, a fourth embodiment for making granularity of performance fine will be explained.

Up to this paragraph, a case of the four packet processing circuits was explained. In this case, the granularity of the packet processing performance becomes 25%, and at worst useless electric power of 25% is consumed (for example, if the necessary processing performance is 25.1%, the packet processing performance will be 50% (equal to that of two packet processing circuits 110-k). In order to solve this problem, there is a method for reducing a frequency of the processing circuit 110-k in addition to a method whereby more packet processing circuits 110-k are provided. If the frequency of the processing circuit 110-k is set to 1/n and performance is reduced to 1/n, it will become possible to cut the electric power by 1-1/n at maximum. In this occasion, if n is set to two and the frequency of the processing circuit is changeable to a frequency of 50%, it becomes possible to realize a performance granularity equivalent to the case where the packet processing circuits 110-k are eight.

Fifth Embodiment

Next, an embodiment for realizing improvement in communication quality as a fifth embodiment will be explained. In this embodiment, in order to improve the communication quality, a configuration of another header information store buffer will be shown.

If there is an input of the burst-like header information 21 or 25, the header information store buffer 120 shown in FIG. 1 and FIG. 5 initially stores the packet in the queue. If this burst-like inputting continues for a long time, it cannot store the header information in the queue and will discard the header information. Even in a case where no discard occurs, a delay of the packet will occur when a large number of pieces of the header information are stored in the queue. When the discard or delay of the header information occurs, discard or delay of a packet provided with the header will occur.

Figure 14:
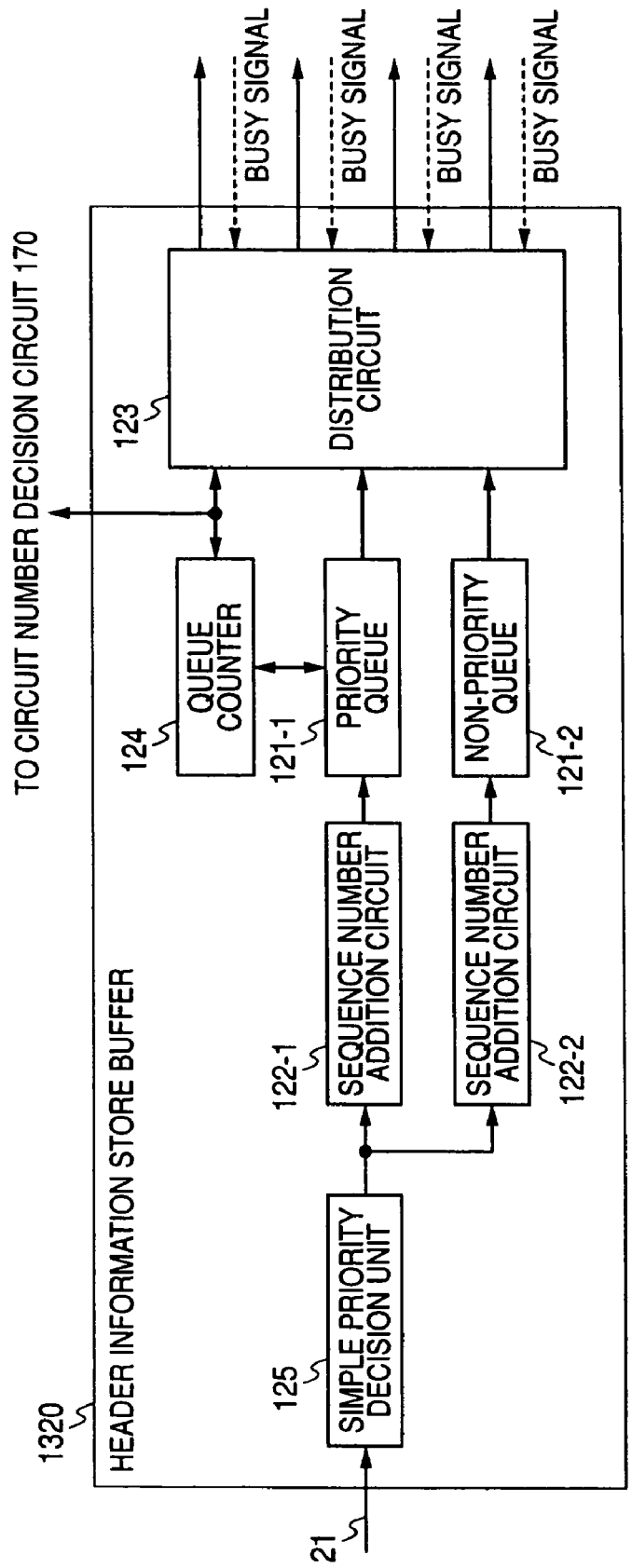
FIG. 14 is a diagram showing a configuration of a header information store buffer 1320 of a fifth embodiment.

Then, a function of preventing the discard and delay of a packet of a high priority in forwarding of the packet becomes necessary. FIG. 14 shows one implementation example of the header information store buffer that prevents the discard and delay of the packet of a high priority. A header information store buffer 1320 of FIG. 14 is newly equipped with a simple priority decision unit 125 in its buffer 120, and is equipped with two sequence number addition circuits 122-1 and 122-2 and with the priority queue 121-1 and the non-priority queue 121-2.

When the header information 21 or 25 inputs at the time of packet input, the simple priority decision unit 125 will decide the priority of the packet having the header information by using a field whose information quantity is comparatively small in the header information. As the field, UPRI 318 and DSCP 315 explained in FIG. 3 are considerable, for example. The header information whose priority is "priority" is transmitted to the sequence number addition circuit 122-1; the header information whose priority is "non-priority" is transmitted to the sequence number addition circuit 122-2. The sequence number addition circuits 122-1 and 122-2 add the sequence numbers and the decided priorities for each input line or output line to the header information, and transmit them to the priority queue 121-1 and the non-priority queue 121-2, respectively. The distribution circuit 123 reads the information from the queue when the header information, the sequence number, and the priority are stored in the priority queue 121-1, and reads the information from the non-priority queue 121-2 when the header information, the sequence number, and the priority are not stored in the priority queue 121-1. Then, it will transmit it to the packet processing circuit 110-$k$.

Moreover, the queue counter 124 is so configured that the total of the priority queue 121-1 and the non-priority queue 121-2 that the circuit number decision circuit 170 uses instead of the counter value of the queue 121 may be counted.

By executing the above operations, the header information of a high priority passes the header information of a low priority and becomes subjected to processing in the packet processing circuit 110-$k$. Therefore, it becomes possible to prevent the header information from being stored in the priority queue 121-1, and to prevent the high-priority header information from being discarded or delayed. In order to prevent the discard and delay of the high-priority packet by making passing between pieces of the header information of different priorities, it is necessary for the simple priority decision unit 125 to guarantee the same order and to decide the header information to be forwarded as of the same priority.

Although the basic operations of the packet processing circuits 110-$k$ are the same, each of them will also transmit the priority that the simple priority decision unit 125 decided to an alignment circuit 1440, in addition to the destination information, the filter information, and the QoS information.

Figure 15:
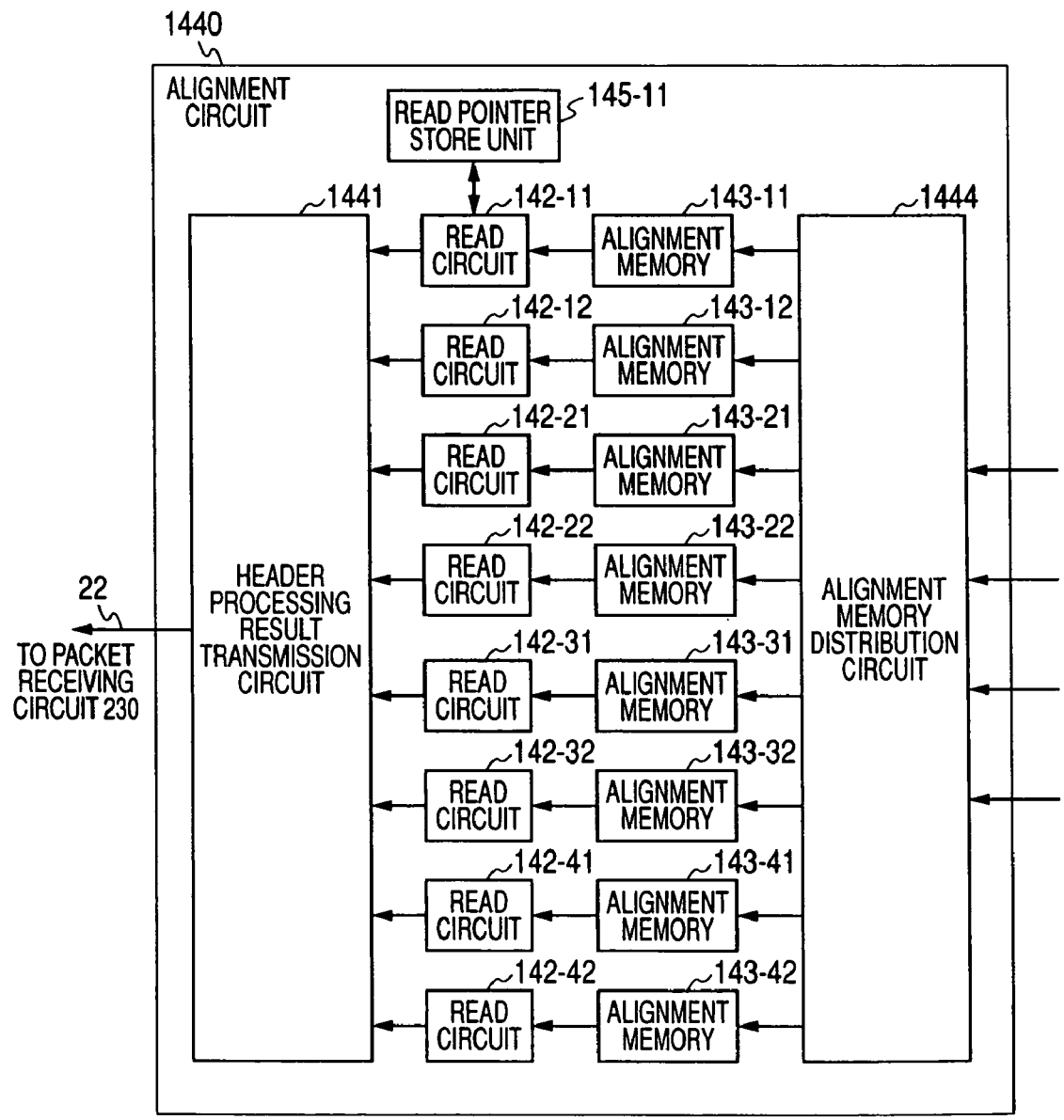
FIG. 15 is a diagram showing a configuration of an alignment circuit 1440 of the fifth embodiment.

The alignment circuit when using the header information store buffer 1320 of FIG. 14 differs from the alignment circuit 140 of FIG. 10, becoming the alignment circuit 1440 of FIG. 15. The alignment circuit 1440 guarantees an order of the packets for each priority regarding the input lines or the output lines, and does not guarantee the order of the packets of the same input/output line whose priorities are different, as described above. The alignment circuit 1440 of FIG. 15 is equipped with the alignment memory 143-$ab$ (a (line number)=1 to 4, and b (priority)=1 or 2) and the read circuit 142-$ab$ for each input line or each output line and for each priority. High-priority packet memory for the input line number "a" or output line number "a" is the alignment memory 143-$a1$ and non-priority packet memory for the same is the alignment memory 143-$a2$. The read circuit 142-$a1$ reads the alignment memory 143-$a1$, and the read circuit 142-$a2$ reads the alignment memory 143-$a2$. The alignment memory distribution circuit 1444 decides the alignment memory 143-$ab$ in which the packet should be stored based on the priority that the simple priority decision unit 125 decided and the input line number 331. A format of the alignment memory 143-$ab$ is the same as that of FIG. 11. The destination information, the filter information, and the QoS information are written therein by using low-order four bits of the sequence number as the address. Incidentally, in the case of the header information store buffer 1320 of the output header processing unit 102, the destination information does not exist and writing is not performed, either. In the read pointer store unit 145-$ab$, the address of the entry 145 of the alignment memory 143-$ab$ that will be read next for each input line or each output line is recorded. Although FIG. 15 only describes the read pointer store unit 145-11 to be connected to the read circuit 142-11, there also exist read pointer store units 145-21 to 42 corresponding to read circuits 142-21 to 42. When the destination information, the filter information, and the QoS information are all written in the entry 145 corresponding to the address that is stored in the read pointer store unit 145-$ab$, the read circuit 142-$ab$ will read the entry 145, and will transmit it to the header processing result transmission circuit 1441. Incidentally, in the case of the header information store buffer 1320 of the output header processing unit 102, when the filter information and the QoS information are all written, the read circuit 142-$ab$ will read the entry 145 and will transmit it to the header processing result transmission circuit 1441. The header processing result transmission circuit 1441 transmits the destination information, as the output line information 22, and the filter information and the QoS information, as the flow information 23 or 26, to the packet receiving circuit 230 or the packet transmission circuit 270, respectively. Incidentally, in the case of the header information store buffer 1320 of the output header processing unit 102, the output line information 22 is not transmitted.

What is claimed is:

1. A packet forwarding device that has a plurality of input lines and a plurality of output lines, and when a packet is inputted into the input line, forwards the packet to one or more than one output line, comprising:
   a plurality of packet processing circuits for performing one or more than one processing among:
   a decision processing of deciding an output line in which the packet is forwarded by header information of the packet,
   a decision processing of deciding presence or absence of forwarding of the packet,
   a decision processing of deciding forwarding priority of the packet, and
   a processing of collecting statistical information of a flow to which the packet belongs;
   a circuit number decision circuit that decides a quantity of the packet processing circuits to be operative for packet processing and notifies at least one of the packet processing circuits to either start or stop packet processing according to a decision result; and
   a distribution circuit for distributing the processing to each of the packet processing circuits in operation for each packet.

2. The packet forwarding device according to claim 1, wherein the circuit number decision circuit decides the quantity of the packet processing devices to be operative for packet processing based on quantities of the input lines and the output lines that are used for communication.

3. The packet forwarding device according to claim 1, wherein the circuit number decision circuit decides the quantity of the packet processing devices to be operative for packet processing based on information inputted from a terminal connected to the packet forwarding device.

4. The packet forwarding device according to claim 1, comprising:
   a queue for storing the header information of the packet,
   wherein the distribution circuit distributes the processing to the packet processing circuit based on the header information read from the queue.

5. The packet forwarding device according to claim 4, wherein the circuit number decision circuit decides the quantity of the packet processing devices to be operative for packet processing according to a quantity of pieces of the header information stored in the queue.

6. The packet forwarding device according to claim 1, further comprising:
a table for storing information necessary to perform the processing, wherein the plurality of packet processing circuits commonly refer to information that is necessary to perform the processing and is stored in the table.

7. The packet forwarding device according to claim 4, wherein the queue is made up of a priority queue that corresponds to each priority of the packet having the header information, and the distribution circuit reads the header information from the priority queue of a high priority preferentially and forwards it to the packet processing circuit.

8. The packet forwarding device according to claim 1, wherein the circuit number decision circuit decides the quantity of the packet processing devices to be operative for packet processing using also an operation frequency of the packet processing circuits decided as being operative.

9. A packet forwarding device comprising:
(1) an interface unit equipped with a packet receiving circuit connected to a plurality of input lines, a packet transmission circuit connected to a plurality of output lines, and a header processing unit for processing header information of the packet, and
(2) a relay processing unit that is connected to an interface unit and relays the packet inputted from the input lines to one or more than one output line,
wherein the header processing unit includes:
(a) a plurality of packet processing circuits that perform one or more than one processing among:
a processing of deciding the output lines in which the packet is forwarded by the header information of the packet,
a processing of deciding presence or absence of forwarding of the packet, and
a processing of collecting statistical information of a flow to which the packet belongs;
(b) a circuit number decision circuit that decides a quantity of the packet processing circuits to be operative for packet processing and notifies at least one of the plurality of packet processing circuits to either start or stop packet processing according to a decision result; and
(c) a distribution circuit for distributing the processing to each of the packet processing circuits in operation for each packet.

10. The packet forwarding device according to claim 9, wherein the header processing unit further has a table for storing information necessary to perform the processing, and the plurality of packet processing circuits commonly refer to the table.

11. The packet forwarding device according to claim 9, wherein the circuit number decision circuit decides the quantity of the packet processing devices to be operative for packet processing based on a quantity of the input lines and the output lines used for communication.

12. The packet forwarding device according to claim 9, wherein the lie number decision circuit decides the quantity of the packet processing devices to be operative for packet processing based on information inputted from the control terminal connected to the packet forwarding device.

13. The packet forwarding device according to claim 9, wherein the header processing unit further has a queue of storing the header information of the packet, and the distributing circuit distributes the processing to the packet processing circuit based on the header information read from the queue.

14. The packet forwarding device according to claim 13, wherein the circuit number decision circuit decides the quantity of the packet processing devices to be operative for packet processing according to a quantity of pieces of the header information stored in the queue.

15. The packet forwarding device according to claim 13, wherein the queue is made up of a plurality of priority queues that correspond to the priority of the packet having the header information, and wherein the distribution circuit reads the header information from the priority queue of a high priority preferentially and forwards it to the packet processing circuit.

* * * * *